US009588345B2

(12) United States Patent
Nakada et al.

(10) Patent No.: US 9,588,345 B2
(45) Date of Patent: *Mar. 7, 2017

(54) HEAD-MOUNTED DISPLAY DEVICE AND CONTROL METHOD FOR THE HEAD-MOUNTED DISPLAY DEVICE

(71) Applicant: SEIKO EPSON CORPORATION, Tokyo (JP)

(72) Inventors: Yuji Nakada, Osaka (JP); Hitoshi Saito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,549

(22) Filed: Nov. 17, 2015

(65) Prior Publication Data

US 2016/0070108 A1 Mar. 10, 2016

Related U.S. Application Data

(63) Continuation of application No. 13/419,010, filed on Mar. 13, 2012, now Pat. No. 9,217,867.

(30) Foreign Application Priority Data

Mar. 24, 2011 (JP) ................................ 2011-066373
Mar. 24, 2011 (JP) ................................ 2011-066393

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 6,456,438 B1 * 9/2002 Lee .................... G02B 27/01
359/630
9,217,867 B2 * 12/2015 Nakada ................ G09G 3/3406
(Continued)

FOREIGN PATENT DOCUMENTS

JP    H08-328512 A    12/1996
JP    H09-211382 A    8/1997
(Continued)

OTHER PUBLICATIONS

Feb. 18, 2015 Office Action issued in U.S. Appl. No. 13/419,010.
(Continued)

*Primary Examiner* — Andrew Sasinowski
*Assistant Examiner* — Henok Heyi
(74) *Attorney, Agent, or Firm* — Oliff PLC

(57) ABSTRACT

A head-mounted display device includes: an image display unit including an image-light generating unit that generates image light representing an image and emits the image light and a light guide unit that guides the emitted image light to the eye of a user, the image display unit being for causing the user to visually recognize a virtual image; and a control unit that includes an operation surface, is connected to the image display unit, and controls image display by the image display unit. When it is assumed that the user shifts the user's attention from the virtual image, the control unit adjusts the luminance of the image-light generating unit or adjusts the image light generated by the image-light generating unit to reduce the visibility of the virtual image.

18 Claims, 21 Drawing Sheets

(51) Int. Cl.
*G09G 3/34* (2006.01)
*G02B 27/00* (2006.01)
*G06F 3/041* (2006.01)

(52) U.S. Cl.
CPC ........... *G06F 3/041* (2013.01); *G09G 3/3406* (2013.01); *G02B 2027/014* (2013.01); *G02B 2027/0118* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 2010/0060552 A1* | 3/2010 | Watanabe | G02B 27/017 345/8 |
| 2010/0063997 A1 | 3/2010 | Sako et al. | |
| 2010/0079356 A1* | 4/2010 | Hoellwarth | G02B 27/017 345/8 |
| 2010/0225566 A1 | 9/2010 | Sato | |
| 2010/0309097 A1* | 12/2010 | Raviv | A63F 13/02 345/8 |
| 2010/0321409 A1* | 12/2010 | Komori | G02B 27/017 345/656 |
| 2011/0043436 A1* | 2/2011 | Yamamoto | G02B 27/0172 345/8 |
| 2011/0115703 A1* | 5/2011 | Iba | G06F 3/013 345/156 |
| 2011/0234476 A1* | 9/2011 | Sugihara | G02B 27/0172 345/8 |
| 2012/0200478 A1 | 8/2012 | Kobayashi | |
| 2012/0206443 A1 | 8/2012 | Kimura et al. | |
| 2012/0242570 A1 | 9/2012 | Kobayashi | |
| 2012/0242677 A1 | 9/2012 | Kobayashi | |
| 2013/0335352 A1 | 12/2013 | Sako et al. | |
| 2015/0022427 A1 | 1/2015 | Sako et al. | |

FOREIGN PATENT DOCUMENTS

| | | |
|---|---|---|
| JP | H10-243319 A | 9/1998 |
| JP | H10-341387 A | 12/1998 |
| JP | 2002-312117 A | 10/2002 |
| JP | 2003-051993 A | 2/2003 |
| JP | 2004-096224 A | 3/2004 |
| JP | 2005-321479 A | 11/2005 |
| JP | 2006-195665 A | 7/2006 |
| JP | 2007-134785 A | 5/2007 |
| JP | 2008-116704 A | 5/2008 |
| JP | 2008-147864 A | 6/2008 |
| JP | 2008-185609 A | 8/2008 |
| JP | 2008-264341 A | 11/2008 |
| JP | 2010-211408 A | 9/2010 |

OTHER PUBLICATIONS

Nov. 21, 2013 Office Action issued in U.S. Appl. No. 13/419,010.
Aug. 14, 2014 Office Action issued in U.S. Appl. No. 13/419,010.
Apr. 10, 2014 Office Action issued in U.S. Appl. No. 13/419,010.
Aug. 14, 2015 Notice of Allowance issued in U.S. Appl. No. 13/419,010.
May 4, 2016 Office Action issued in U.S. Appl. No. 14/566,014.
Oct. 21, 2016 Office Action issued in U.S. Appl. No. 14/566,014.

* cited by examiner

HEAD-MOUNTED DISPLAY DEVICE AND CONTROL METHOD FOR THE HEAD-MOUNTED DISPLAY DEVICE

This is a Continuation of application Ser. No. 13/419,010 filed Mar. 13, 2012, which claims the benefit of Japanese Patent Application No. 2011-066373 filed Mar. 24, 2011 and Japanese Patent Application No. 2011-066393 filed Mar. 24, 2011. The disclosure of the prior applications is hereby incorporated by reference herein in its entirety.

BACKGROUND

1. Technical Field

The present invention relates to a head-mounted display device, which is a display device mounted on the head, and a control method for the head-mounted display device.

2. Related Art

There is known a head-mounted display device (a head mounted display, HMD), which is a display device mounted on the head. For example, the head-mounted display device generates image light representing an image using a liquid crystal display and a light source and guides the generated image light to the eyes of a user using a projection optical system and a light guide plate to thereby cause the user to recognize a virtual image.

In the head mounted display explained above, when the user operates a control unit of the head mounted display for the purpose of, for example, playback, stop, and fast forward of a video, it is likely that a virtual image displayed before the eyes of the user blocks the visual field of the user and hinders the operation. In order to solve such a problem, in the past, there is known a technique for picking up an image of a range including a display region with a camera, analyzing the picked-up image to detect the hands of the user, and reducing the visibility of an image displayed in a region formed between one hand and the other hand of the detected hands to improve the visibility of an external scene (e.g., JP-A-2010-211408).

With the head mounted display explained above, the user can enjoy images (videos) and music anywhere while wearing the head mounted display like, for example, eyeglasses. On the other hand, in a worn state of the head mounted display, since an image blocking an external scene is always displayed before the eyes of the user, the user could feel inconvenience. In order to solve such a problem, in the past, there is known a technique for detecting that a user is walking, automatically stopping image display of the head mounted display, and improving the visibility of an external scene (e.g., JP-A-09-211382).

Besides, JP-A-09-211382, JP-A-2008-116704, JP-A-2003-51993, JP-A-2007-134785, and JP-A-2004-96224 are examples of related art.

However, in the technique in the past for detecting the hands of a user, for example, it is likely that a malfunction due to misdetection occurs in a use in a public space. In the technique in the past for detecting that a user is walking, inconvenience for a walking user is reduced. However, in the past, there is a demand for also reducing, even when the user is not walking, inconvenience that the user feels, for example, when the user turns the user's face away from an image displayed on the head mounted display to shift the user's attention from the image.

SUMMARY

An advantage of some aspect of the invention is to provide, in a head-mounted display device, a technique for improving the visibility of an external scene when it is assumed that a user shifts the user's attention from a virtual image.

Application Example 1

This application example of the invention is directed to a head-mounted display device including: an image display unit including an image-light generating unit that generates image light representing an image and emits the image light and a light guide unit that guides the emitted image light to the eye of a user, the image display unit being for causing the user to visually recognize a virtual image; and a control unit that is connected to the image display unit and controls image display by the image display unit. When it is assumed that the user shifts the user's attention from the virtual image, the control unit adjusts the luminance of the image-light generating unit or adjusts the image light generated by the image-light generating unit to reduce the visibility of the virtual image.

With such a configuration, when it is assumed that the user shifts the user's attention from the virtual image, the control unit adjusts the luminance of the image-light generating unit or adjusts the image light generated by the image-light generating unit to reduce the visibility of the virtual image. Therefore, in the head-mounted display device, when it is assumed that the user shifts the user's attention from the virtual image, it is possible to improve the visibility of an external scene.

Application Example 2

This application example of the invention is directed to the head-mounted display device of Application Example 1, which further includes a direction determining unit that determines whether the user faces an operation surface of the control unit. The control unit further includes the operation surface. When it is determined that the user faces the operation surface, the control unit adjusts the luminance of the image-light generating unit or adjusts the image light generated by the image-light generating unit to reduce the visibility of the virtual image.

With such a configuration, the direction determining unit determines whether the user faces the operation surface of the control unit. When it is determined that the user faces the operation surface, the control unit adjusts the luminance of the image-light generating unit or adjusts the image light generated by the image-light generating unit to reduce the visibility of the virtual image. Therefore, in the head-mounted display device, it is possible to detect, with a configuration different from that in the past, that the user attempts to operate the control unit of the head-mounted display device. It is possible to improve the visibility of an external scene in the image display unit.

Application Example 3

This application example of the invention is directed to the head-mounted display device of Application Example 2, which further includes: a head-side light emitting unit that is arranged in the image display unit and emits invisible light; and a control-unit-side light receiving unit that is arranged on the operation surface and receives the emitted invisible light. The direction determining unit determines whether the user faces the operation surface of the control unit by determining, using an output signal of the control-unit-side light receiving unit, whether the operation surface and the image display unit are opposed to each other.

With such a configuration, the head-side light emitting unit that emits visible light is arranged in the image display unit and the control-unit-side light receiving unit that receives the emitted invisible light is arranged on the operation surface. Therefore, the direction determining unit can determine whether the user faces the operation surface of the control unit by determining, using an output signal of the control-unit-side light receiving unit, whether the operation surface and the image display unit are opposed to each other.

Application Example 4

This application example of the invention is directed to the head-mounted display device of Application Example 3, which further includes: a control-unit-side light emitting unit that is arranged in the operation surface and emits invisible light; and a head-side light receiving unit that is arranged in the image display unit and receives the emitting invisible light. The control unit causes the head-side light emitting unit and the control-unit-side light emitting unit to alternately emit the invisible light. The direction determining unit determines whether the user faces the operation surface of the control unit by determining, using an output signal of the control-unit-side light receiving unit and an output signal of the head-side light receiving unit, whether the operation surface and the image display unit are opposed to each other.

With such a configuration, the control-unit-side light emitting unit that emits invisible light is further arranged on the operation surface and the head-side light receiving unit that receives the emitted invisible light is further arranged in the image display unit. The control unit causes the head-side light emitting unit and the control-unit-side light emitting unit to alternately emit the invisible light. The direction determining unit determines whether the user faces the operation surface of the control unit by determining, using an output signal of the control-unit-side light receiving unit and an output signal of the head-side light receiving unit, whether the operation surface and the image display unit are opposed to each other. Therefore, in the head-mounted display device including the direction determining unit, it is possible to improve accuracy of the determination by the direction determining unit.

Application Example 5

This application example of the invention is directed to the head-mounted display device of Application Example 3 or 4, which further includes a contact detecting unit that is arranged in the control unit and for detecting contact with the control unit. When the contact with the control unit is detected, the control unit causes the head-side light emitting unit to emit the invisible light and causes the control-unit-side light emitting unit to emit the invisible light.

With such a configuration, the contact detecting unit for detecting contact with the control unit is arranged in the control unit. Therefore, when the contact with the control unit is detected, the control unit can cause the head-side light emitting unit to emit the invisible light and cause the control-unit-side light emitting unit to emit the invisible light.

Application Example 6

This application example of the invention is directed to the head-mounted display device of any of Application Examples 3 to 5, wherein the invisible light emitted by the head-side light emitting unit includes identification information for identifying the image display unit according to pulse modulation of the invisible light. The control unit includes a storing unit that stores authentication information for authenticating the image display unit connected to the control unit. The direction determining unit further includes an authenticating unit that authenticates the image display unit by acquiring the identification information from an output signal of the control-unit-side light receiving unit and performing a search as to whether the acquired identification information is included in the authentication information.

With such a configuration, the invisible light emitted by the head-side light emitting unit includes the identification information for identifying the image display unit. Therefore, the authenticating unit can authenticate the image display unit by acquiring the identification information from an output signal of the control-unit-side light receiving unit and performing a search as to whether the acquired identification information is included in the authentication information. As a result, it is possible to reduce misrecognition.

Application Example 7

This application example of the invention is directed to the head-mounted display device of any of Application Examples 2 to 6, which further includes: an acceleration-information detecting unit that is arranged in the image display unit and for detecting acceleration information of the image display unit; and an angular-velocity-information detecting unit that is arranged in the image display unit and for detecting angular velocity information of the image display unit. The direction determining unit determines whether the user faces the operation surface of the control unit by determining, using the detected acceleration information and the detected angular velocity information, whether the operation surface and the image display unit are opposed to each other.

With such a configuration, the acceleration-information detecting unit for detecting acceleration information of the image display unit and the angular-velocity-information detecting unit for detecting angular velocity information of the image display unit are arranged in the image display unit. Therefore, the direction determining unit can determine, using the detected acceleration information and the detected angular velocity information, whether the user faces the operation surface of the control unit.

Application Example 8

This application example of the invention is directed to the head-mounted display device of any of Application Examples 2 to 7, wherein the image-light generating unit includes: a display device that generates the image; and a light source that emits image light representing the generated image. When it is determined that the user faces the operation surface of the control unit, the control unit adjusts the luminance of the image-light generating unit by turning off or reducing illumination light of the light source.

With such a configuration, when it is determined that the user faces the operation surface of the control unit, the control unit adjusts the luminance of the image-light generating unit by turning off or reducing illumination light of the light source. Therefore, it is possible to improve the visibility of an external scene in the image display unit.

Application Example 9

This application example of the invention is directed to the head-mounted display device of any of Application Examples 2 to 7, wherein the image-light generating unit includes: a display device that generates the image; and a light source including plural light emitting members for emitting image light representing the generated image. When it is determined that the user faces the operation surface of the control unit, the control unit adjusts the luminance of the image-light generating unit by turning off or reducing illumination light of at least a part of the plural light emitting members.

With such a configuration, when it is determined that the user faces the operation surface of the control unit, the control unit adjusts the luminance of the image-light generating unit by turning off or reducing illumination light of at least a part of the plural light emitting members. Therefore, it is possible to improve the visibility of an external scene in a part of the image display unit.

Application Example 10

This application example of the invention is directed to the head-mounted display device of any of Application Examples 2 to 7, wherein the control unit transmits image data to the image-light generating unit. When it is determined that the user faces the operation surface of the control unit, the control unit adjusts the image light generated by the image-light generating unit by replacing at least a part of the image data to be transmitted with dummy data indicating black.

With such a configuration, when it is determined that the user faces the operation surface of the control unit, the control unit adjusts the image light generated by the image-light generating unit by replacing at least a part of the image data transmitted to the image-light generating unit with dummy data indicating black. Therefore, it is possible to improve the visibility of an external scene in the image display unit.

Application Example 11

This application example of the invention is directed to the head-mounted display device of any of Application Examples 2 to 7, wherein the image-light generating unit includes: a display device that generates the image; and a light source that emits image light representing the generated image. When it is determined that the user faces the operation surface of the control unit, the control unit adjusts the image light generated by the image-light generating unit by reducing a liquid crystal aperture ratio of at least a part of the display device.

With such a configuration, when it is determined that the user faces the operation surface of the control unit, the control unit adjusts the image light generated by the image-light generating unit by reducing a liquid crystal aperture ratio of at least a part of the display device. Therefore, it is possible to improve the visibility of an external scene in the image display unit.

Application Example 12

This application example of the invention is directed to the head-mounted display device of Application Example 1, which further includes a detecting unit that acquires change information indicating a change in the direction of the image display unit and detects, using the change information, the movement of the head exceeding a fixed amount of the user wearing the image display unit. When the movement of the head exceeding the fixed amount is detected, the control unit adjusts the luminance of the image-light generating unit or adjusts the image light generated by the image-light generating unit to reduce the visibility of the virtual image.

With such a configuration, the detecting unit acquires change information indicating a change in the direction of the display unit and detects, using the change information, the movement of the head exceeding the fixed amount of the user wearing the image display unit. When the movement of the head exceeding the fixed amount is detected, the control unit adjusts the luminance of the image-light generating unit or adjusts the image light generated by the image-light generating unit to reduce the visibility of the virtual image. Therefore, in the head-mounted display device, it is possible to detect the movement of the head exceeding the fixed amount of the user wearing the image display unit and improve the visibility of an external scene.

Application Example 13

This application example of the invention is directed to the head-mounted display device of Application Example 12, wherein the detecting unit sets, according to occurrence of a trigger set in advance, an initial position, which is a position serving as a reference in detecting the movement of the image display unit, acquires the change information with respect to the initial position, and detects, using the change information, the movement of the head exceeding the fixed amount.

With such a configuration, the detecting unit sets an initial position, which is a position serving as a reference in detecting the movement of the image display unit, and acquires the change information with respect to the initial position. Therefore, it is possible to detect, using the change information, the movement of the head exceeding the fixed amount of the user wearing the image display unit.

Application Example 14

This application example of the invention is directed to the head-mounted display device of Application Example 13, wherein the detecting unit specifies the initial position and the change information according to a combination of the angle of the head corresponding to the movement of the head in the vertical direction of the user wearing the image display unit and the direction of the face of the user corresponding to the movement of the face in the horizontal direction.

With such a configuration, the detecting unit can specify the initial position and the change information according to a combination of the angle of the head corresponding to the movement of the head in the vertical direction of the user wearing the image display unit and the direction of the face of the user corresponding to the movement of the face in the horizontal direction.

Application Example 15

This application example of the invention is directed to the head-mounted display device of Application Example 12 or 13, wherein the image display unit further includes an angular-velocity detecting unit that detects the angular velocity of the image display unit. The detecting unit acquires the angular velocity detected as the change information. When an angle calculated from the angular velocity exceeds a first threshold set in advance and the angular velocity exceeds a second threshold set in advance, the detecting unit determines that the movement of the head exceeding the fixed amount is detected.

With such a configuration, when an angle calculated from an angular velocity detected by the angular-velocity detecting unit exceeds the first threshold set in advance and the angular velocity detected by the angular-velocity detecting unit exceeds the second threshold set in advance, the detecting unit determines that the movement of the head exceeding the fixed amount is detected. Therefore, it is possible to neglect the small movement of the user by appropriately setting the first threshold and neglect the slow movement of the user by appropriately setting the second threshold.

Application Example 16

This application example of the invention is directed to the head-mounted display device of any of Application Examples 12 to 15, wherein the image display unit further includes an acceleration detecting unit that detects the acceleration of the image display unit. The detecting unit further acquires the detected acceleration as the change information and determines, using the acceleration and the tilt of the image display unit calculated from the acceleration, whether the movement of the head exceeding the fixed amount is detected.

With such a configuration, the detecting unit further determines, further using the tilt of the image display unit calculated from the acceleration detected by the acceleration detecting unit, whether the movement of the head exceeding the fixed amount is detected. Therefore, it is possible to improve accuracy of the determination in the detecting unit.

Application Example 17

This application example of the invention is directed to the head-mounted display device of Application Example 12 or 13, wherein the image display unit further includes: a terrestrial-magnetism detecting unit that detects the direction of the image display unit using terrestrial magnetism; and an acceleration detecting unit that detects the acceleration of the image display unit. The detecting unit acquires the detected direction and the detected acceleration as the change information. When an angle calculated from the direction exceeds a first threshold set in advance and the acceleration exceeds a second threshold set in advance, the detecting unit determines that the movement of the head exceeding the fixed amount is detected.

With such a configuration, when an angle calculated from the direction detected by the terrestrial-magnetism detecting unit exceeds the first threshold set in advance and the acceleration detected by the terrestrial-magnetism detecting unit exceeds the second threshold set in advance, the detecting unit determines that the movement of the head exceeding the fixed amount is detected. Therefore, it is possible to obtain effects same as those obtained in Application Example 15, with the configuration in which the terrestrial-magnetism detecting unit and the acceleration detecting unit are provided in place of the angular-velocity detecting unit in Application Example 15.

Application Example 18

This application example of the invention is directed to the head-mounted display device of any of Application Examples 12 to 17, wherein the trigger set in advance is at least any one of power-on of the head-mounted display device, detection of startup of a predetermined application, and detection of pressing of a predetermined button.

With such a configuration, it is possible to set, according to at least any one of power-on of the head-mounted display device, detection of startup of a predetermined application, and detection of pressing of a predetermined button, an initial position that should be a reference in detecting the movement of the image display unit.

Application Example 19

This application example of the invention is directed to the head-mounted display device of any of Application Examples 12 to 18, wherein the image-light generating unit includes: a display device that generates the image; and a light source that emits image light representing the generated image. When the movement of the head exceeding the fixed amount is detected, the control unit adjusts the luminance of the image-light generating unit by turning off or reducing illumination light of the light source.

With such a configuration, when the movement of the head exceeding the fixed amount is detected, the control unit adjusts the luminance of the image-light generating unit by turning off or reducing illumination light of the light source. Therefore, it is possible to improve the visibility of an external scene in the image display unit.

Application Example 20

This application example of the invention is directed to the head-mounted display device of any of Application Examples 12 to 18, wherein when the movement of the head exceeding the fixed amount is detected, the control unit adjusts the image light generated by the image-light generating unit by temporarily stopping the generation of image light by the image-light generating unit.

With such a configuration, when the movement of the head exceeding the fixed amount is detected, the control unit adjusts the image light generated by the image-light generating unit by temporarily stopping the generation of image light by the image-light generating unit. Therefore, it is possible to improve the visibility of an external scene in the image display unit.

Application Example 21

This application example of the invention is directed to the head-mounted display device of any of Application Examples 12 to 20, wherein the image display unit includes an image pick-up unit that picks up an image of the eyeball of the user. The detecting unit further acquires a line-of-sight movement amount indicating a movement amount with respect to the center position of the iris of the user by analyzing the picked-up image of the eyeball. When the line-of-sight movement amount exceeds a third threshold set in advance, the control unit further adjusts the luminance of the image-light generating unit or adjusts the image light generated by the image-light generating unit to reduce the visibility of the virtual image.

With such a configuration, the detecting unit acquires a line-of-sight movement amount indicating a movement amount with respect to the center position of the iris of the user by analyzing the picked-up image of the eyeball. When the line-of-sight movement amount exceeds the third threshold set in advance, the control unit further adjusts the luminance of the image-light generating unit or adjusts the image light generated by the image-light generating unit to reduce the visibility of the virtual image. Therefore, in addition to the effect that it is possible to improve the visibility of an external scene, it is possible to detect that the user shifts the user's line of sight and improve the visibility of an external scene.

The invention can be realized in various forms. For example, the invention can be implemented in forms of a head-mounted display device and a control method for the head-mounted display device, a head-mounted display system, a computer program for realizing functions of the apparatus, the method, or the system, and a recording medium having the computer program stored therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below.

A. First Embodiment

A-1. Configuration of a Head-mounted Display Device

Figure 1:
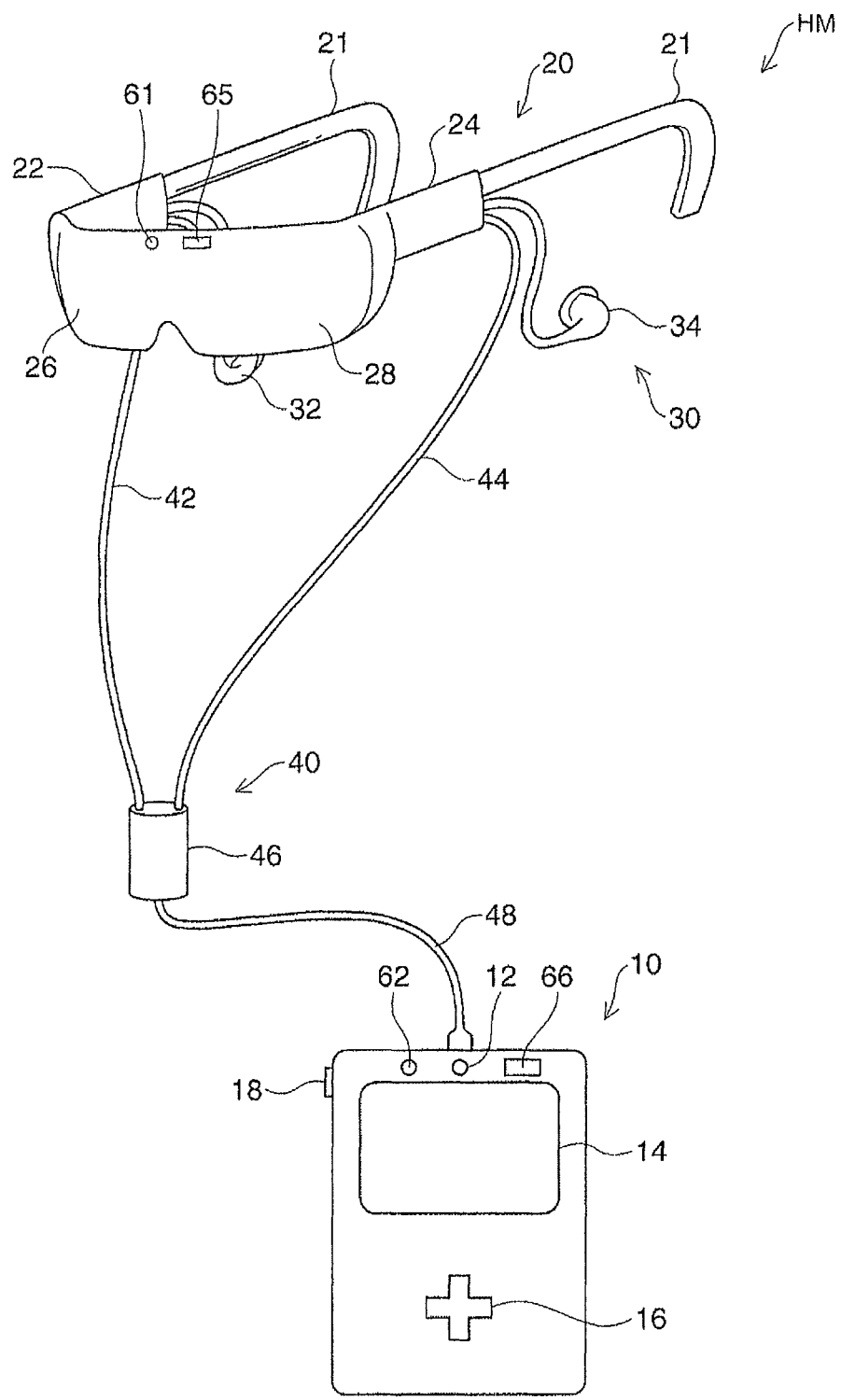
FIG. 1 is an explanatory diagram showing the configuration of the exterior of a head-mounted display device in a first embodiment of the invention.

FIG. 1 is an explanatory diagram showing the configuration of the exterior of a head-mounted display in a first embodiment of the invention. A head-mounted display device HM is a display device mounted on the head and is also called head mounted display (HMD). The head mounted display HM in this embodiment is an optical see-through head-mounted display device with which a user can visually recognize a virtual image and at the same time directly visually recognize an external scene.

The head mounted display HM includes an image display unit 20 that causes the user to visually recognize a virtual image in a state in which the image display unit 20 is mounted on the head of the user and a control unit (a controller) 10 that controls the image display unit 20.

The image display unit 20 is a mounted member mounted on the head of the user. In this embodiment, the image display unit 20 has an eyeglass shape. The image display unit 20 includes ear hooking sections 21, a right display driving unit 22, a left display driving unit 24, a right optical panel 26, a left optical panel 28, a head-side light emitting unit 61, and a head-side light receiving unit 65. The ear hooking sections 21 are members provided to transverse on the ears of the user from the ends of the right display driving unit 22 and the left display driving unit 24 and function as temples. The right optical panel 26 and the left optical panel 28 are arranged to be respectively located before the right and left eyes of the user in a state in which the user wears the image display unit 20. The right display driving unit 22 is arranged in a connecting place of the ear hooking section 21 for the right ear and the right optical panel 26. The left display driving unit 24 is arranged in a connecting place of the ear hooking section 21 for the left ear and the left optical panel 28. In the following explanation, the right display driving unit 22 and the left display driving unit 24 are collectively referred to simply as "display driving unit". The right optical panel 26 and the left optical panel 28 are collectively referred to simply as "optical panel".

The head-side light emitting unit 61 and the head-side light receiving unit 65 are arranged to be adjacent to each other on the front surface of a housing forming the optical panel (in this embodiment, near an upper part in the center of the right optical panel 26 and the left optical panel 28). As the head-side light emitting unit 61 in this embodiment, an infrared-emitting diode is used. The head-side light emitting unit 61 emits an infrared ray, which is invisible light. As the head-side light receiving unit 65 in this embodiment, an infrared photodiode is used. The head-side light receiving unit 65 receives an infrared ray.

The display driving unit includes an LCD (Liquid Crystal Display), a projection optical system, and the like, which are not shown in the figure. Details are explained later. The optical panel includes a light guide plate and a light modulating plate, which are not shown in the figure. The light guide plate is formed of a light transmissive resin material or the like and emits image light, which is captured from the display driving unit, to the eyes of the user. The light modulating plate is an optical device of a thin plate shape and is arranged to cover the front side (a side opposite to the side of the eyes of the user) of the light guide plate. The light modulating plate protects the light guide plate, suppresses, for example, damage and adhesion of stains to the light guide plate, and adjusts the light transmittance of the light modulating plate. Consequently, the light modulating plate can adjust an amount of external light entering the eyes of the user and adjust easiness of visual recognition of a virtual image. The light modulating plate can be omitted.

The image display unit 20 further includes a right earphone 32 for the right ear and a left earphone 34 for the left ear. The right earphone 32 and the left earphone 34 are respectively worn on the right ear and the left ear when the user wears the image display unit 20.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided at a branch point. The right cord 42 is connected to the right display driving unit 22. The left cord 44 is connected to the left display driving unit 24. The image display unit 20 and the control unit 10 perform transmission of various signals via the connecting unit 40. Connectors (not shown) that fit with each other are respectively provided at an end on the opposite side of the coupling member 46 in the main body cord 48 and the control unit 10. The control unit 10 and the image display unit 20 are connected and disconnected by fitting the connector of the main body cord 48 and the connector of the control unit 10 and releasing the fitting. As the right cord 42, the left cord 44, and the main body cord 48, for example, a metal cable and an optical fiber can be adopted.

The control unit 10 is a device for operating the head mounted display HM. The control unit 10 includes a lighting unit 12, a touch pad 14, a cross key 16, a power switch 18, a control-unit-side light emitting unit 62, and a control-unit-side light receiving unit 66. The lighting unit 12 notifies an operation state of the head mounted display HM (e.g., ON or OFF of a power supply) with a light emission state of the lighting unit 12. As the lighting unit 12, for example, an LED (Light Emitting Diode) can be used. The touch pad 14 detects finger operation by the user on an operation surface (operation panel) of the touch pad 14 and outputs a signal corresponding to detection content. The cross key 16 detects pressing operation of keys corresponding to up, down, left, and right directions and outputs a signal corresponding to detection content. The power switch 18 detects slide operation of the switch to switch a power-on state of the head mounted display HM. In a housing of the control unit 10, a surface on a side on which the main components (i.e., the touch pad 14 and the cross key 16) for the user to perform operation of the control unit 10 are arranged is referred to as "operation surface" as well.

The control-unit-side light emitting unit 62 and the control-unit-side light receiving unit 66 are arranged in positions where the control-unit-side light emitting unit 62 and the control-unit-side light receiving unit 66 are less easily hidden when the user holds the control unit 10, for example, near a center line set in the vertical direction on the operation surface of the control unit 10. In this embodiment, the control-unit-side light emitting unit 62 and the control-unit-side light receiving unit 66 are arranged on both sides of the lighting unit 12 on the operation surface. As the control-unit-side light emitting unit 62 in this embodiment, an infrared-emitting diode is used. The control-unit-side light emitting unit 62 emits an infrared ray, which is invisible light. As the control-unit-side light receiving unit 66 in this embodiment, an infrared photodiode is used. The control-unit-side light receiving unit 66 receives an infrared ray.

Figure 2:
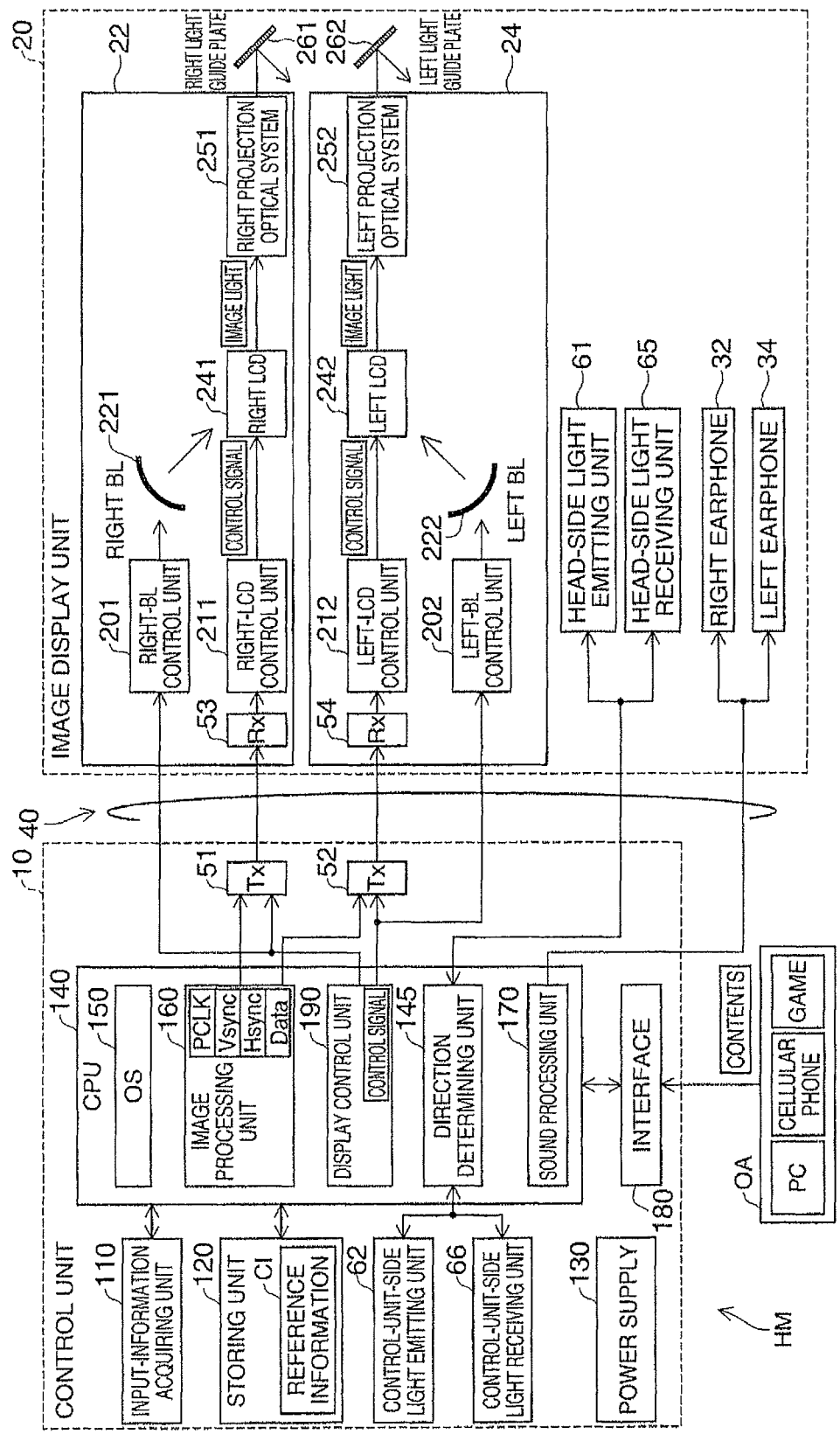
FIG. 2 is a functional block diagram showing the configuration of a head mounted display.

FIG. 2 is a functional block diagram showing the configuration of the head mounted display HM. The control unit 10 includes the control-unit-side light emitting unit 62, a control-unit-side light receiving unit 66, an input-information acquiring unit 110, a storing unit 120, a power supply 130, a CPU 140, an interface 180, and transmitting units (Tx) 51 and 52. These units are connected to one another by a not-shown bus.

The input-information acquiring unit 110 has a function of acquiring a signal corresponding to an operation input by the user (e.g., an operation input to the touch pad 14, the cross key 16, or the power switch 18). The storing unit 120 is a storing unit including a ROM, a RAM, a DRAM, and a hard disk, which are not shown in the figure. The power supply 130 supplies electric power to the units of the head mounted display HM. As the power supply 130, for example, a secondary battery can be used.

The CPU 140 executes a computer program installed in advance to thereby provide a function of an operating system (OS) 150. The CPU 140 expands firmware or a computer program stored in the ROM or the hard disk on the RAM and executes the firmware or the computer program to thereby function as a direction determining unit 145, an image processing unit 160, a sound processing unit 170, and a display control unit 190 as well. Details of the units are explained later.

The control-unit-side light receiving unit 66 receives an infrared ray emitted from the head-side light emitting unit 61 and outputs an output signal corresponding to a signal pattern of the received infrared ray to the direction determining unit 145. The direction determining unit 145 controls driving of the head-side light emitting unit 61, the control-unit-side light emitting unit 62, the head-side light receiving unit 65, and the control-unit-side light receiving unit 66 and executes user-side see-through processing using output signals from the head-side light receiving unit 65 and the control-unit-side light receiving unit 66. The user-side see-through processing is processing for erasing a virtual image displayed on the image display unit 20 when it is determined that the user faces the operation surface of the control unit 10.

The interface 180 is an interface for connecting various external apparatuses OA (e.g., a personal computer PC, a cellular phone terminal, and a game terminal), which are supply sources of contents, to the control unit 10. As the interface 180, the control unit 10 can include, for example, a USB interface, a micro USB interface, an interface for memory card, or a wireless LAN interface. Contents mean information contents including an image (a still image or a moving image) and sound.

The image processing unit 160 generates a clock signal PCLK, a vertical synchronization signal VSync, a horizontal synchronization signal HSync, and image data Data on the basis of contents input via the interface 180 and supplies these signals to the image display unit 20 via the connecting unit 40. Specifically, the image processing unit 160 acquires an image signal included in the contents. For example, in the case of a moving image, the acquired image signal is, in general, an analog signal including thirty frame images per second. The image processing unit 160 separates synchronization signals such as the vertical synchronization signal VSync and the horizontal synchronization signal HSync from the acquired image signal. The image processing unit 160 generates the clock signal PCLK using a not-shown PLL circuit according to periods of the vertical synchronization signal VSync and the horizontal synchronization signal HSync separated from the image signal.

The image processing unit 160 converts the analog image signal, from which the synchronization signals are separated, into a digital image signal using a not-shown A/D conversion circuit or the like. Thereafter, the image processing unit 160 stores, frame by frame, the digital image signal after the conversion in the DRAM in the storing unit 120 as the image data Data (RGB data) of a target image. The image processing unit 160 may execute, on the image data, image processing such as resolution conversion processing, various kinds of color tone correction processing such as adjustment of luminance and chroma, and keystone correction processing according to necessity.

The image processing unit 160 transmits the generated clock signal PCLK, vertical synchronization signal VSync, and horizontal synchronization signal HSync and the image data Data stored in the DRAM in the storing unit 120 respectively via the transmitting units 51 and 52. The image data Data transmitted via the transmitting unit 51 is referred to as "image data for right eye" as well. The image data Data transmitted via the transmitting unit 52 is referred to as "image data for left eye" as well. The transmitting units 51 and 52 function as transceivers for serial transmission between the control unit 10 and the image display unit 20.

The display control unit 190 generates control signals for controlling the right display driving unit 22 and the left display driving unit 24. Specifically, the display control unit 190 separately controls, according to the control signals, for example, turn-on and turn-off of driving of a right LCD 241 by a right-LCD control unit 211, turn-on and turn-off of driving of a right backlight 221 by a right-backlight control unit 201, turn-on and turn-off of driving of a left LCD 242 by a left-LCD control unit 212, and turn-on and turn-off of driving of a left backlight 222 by the a left-backlight control unit 202 to thereby control generation and emission of image light by each of the right display driving unit 22 and the left display driving unit 24. For example, the display control unit 190 causes both the right display driving unit 22 and the left display driving unit 24 to generate image lights, causes only one of the right display driving unit 22 and the left display driving unit 24 to generate image light, or causes the right display driving unit 22 and the left display driving unit 24 not to generate image light.

The display control unit 190 transmits the control signals for the right-LCD control unit 211 and the left-LCD control unit 212 respectively via the transmitting units 51 and 52. The display control unit 190 transmits the control signals for the right-backlight control unit 201 and the left-backlight control unit 202.

The sound processing unit 170 acquires a sound signal included in the contents, amplifies the acquired sound signal, and supplies the sound signal to the right earphone 32 and the left earphone 34 of the image display unit 20 via the connecting unit 40.

The image display unit 20 includes the right display driving unit 22, the left display driving unit 24, a right light guide plate 261 functioning as the right optical panel 26, a left light guide plate 262 functioning as the left optical panel 28, the head-side light emitting unit 61, the head-side light receiving unit 65, the right earphone 32, and the left earphone 34.

The head-side light receiving unit 65 receives an infrared ray emitted from the control-unit-side light emitting unit 62 and outputs an output signal corresponding to a signal pattern of the received infrared ray to the direction determining unit 145. The right display driving unit 22 includes a receiving unit (Rx) 53, the right-backlight (BL) control unit 201 and the right-backlight (BL) 221 functioning as a light source, the right LCD-control unit 211 and the right LCD 241 functioning as a display device, and a right projection optical system 251. The right-backlight control unit 201, the right-LCD control unit 211, the right backlight 221, and the right LCD 241 are collectively referred to as "image-light generating unit" as well.

The receiving unit 53 functions as a transceiver for serial transmission between the control unit 10 and the image display unit 20. The right-backlight control unit 201 has a function of driving the right backlight 221 on the basis of an input control signal. The right backlight 221 is a light emitting member such as an LED. The right LCD-control unit 211 has a function of driving the right LCD 241 on the basis of the clock signal PCLK, the vertical synchronization signal VSync, the horizontal synchronization signal HSync, and the image data for right eye input via the receiving unit 53. The right LCD 241 is a transmissive liquid crystal panel in which plural pixels are arranged in a matrix shape.

Figure 3:
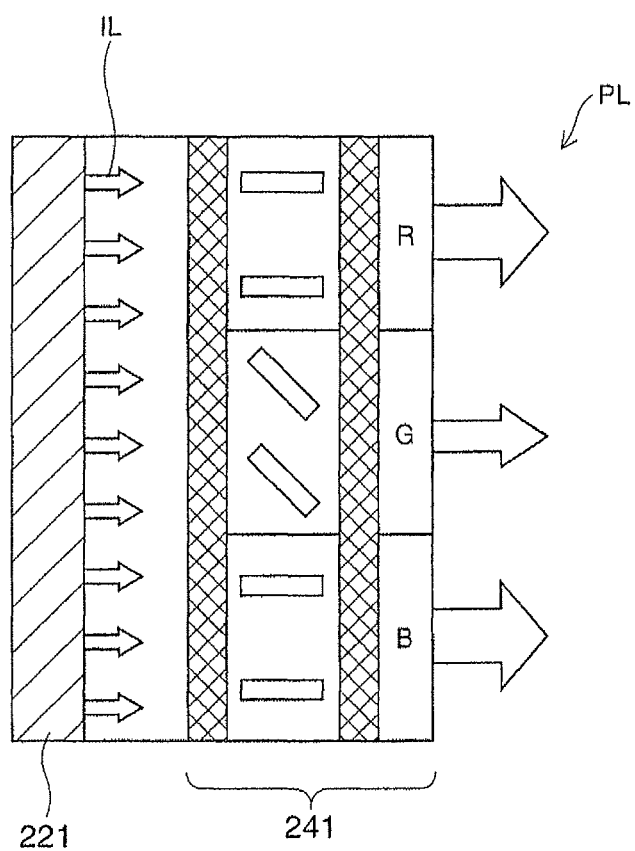
FIG. 3 is an explanatory diagram showing a state in which image light is emitted by an image-light generating unit.

FIG. 3 is an explanatory diagram showing a state in which image light is emitted by the image-light generating unit. The right LCD 241 has a function of driving liquid crystals corresponding to the positions of the pixels arranged in the matrix shape to thereby change the transmittance of light transmitted through the right LCD 241 to modulate illumination light IL irradiated from the right backlight 221 into effective image light PL representing an image. As shown in FIG. 3, in this embodiment, the backlight system is adopted. However, image light may be emitted using a front light system or a reflection system.

The right projection optical system 251 shown in FIG. 2 includes a collimate lens that converts image light emitted from the right LCD 241 into light beams in a parallel state. The right light guide plate 261 functioning as the right optical panel 26 guides the image light output from the right projection optical system 251 to the right eye of the user while reflecting the image light along a predetermined optical path. The right projection optical system 251 and the right light guide plate 261 are collectively referred to as "light guide unit" as well.

The left display driving unit 24 includes a receiving unit (Rx) 54, the left-backlight (BL) control unit 202 and the left-backlight (BL) 222 functioning as a light source, the left-LCD control unit 212 and the left LCD 242 functioning as a display device, and a left projection optical system 252. The left-backlight control unit 202, the left-LCD control unit 212, the left backlight 222, and the left LCD 242 are collectively referred to as "image light generating unit" as well. The left projection optical system 252 and the left light guide plate 262 are collectively referred to as "light guide unit" as well. The right display driving unit 22 and the left display driving unit 24 form a pair. The units of the left display driving unit 24 have configurations and perform operations same as those of the units of the right display driving unit 22 explained below. Therefore, detailed explanation of the units of the left display driving unit 24 is omitted.

Figure 4:
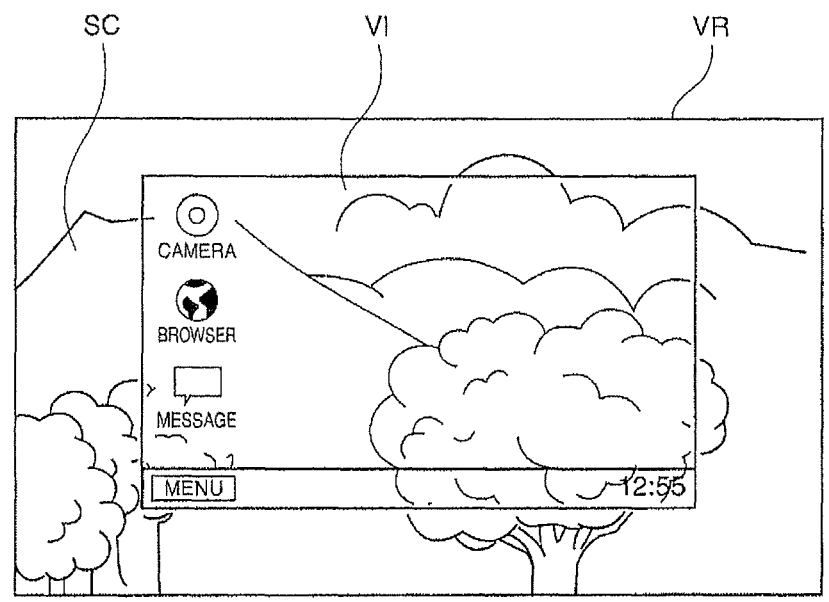
FIG. 4 is an explanatory diagram showing an example of a virtual image recognized by a user.

FIG. 4 is an explanatory diagram showing an example of a virtual image recognized by the user. The image lights guided to the eyes of the user of the head mounted display HM are focused on the retinas of the user as explained above, whereby the user can visually recognize a virtual image. As shown in FIG. 4, a virtual image VI is displayed in a visual field VR of the user of the head mounted display HM. In the visual field VR of the user except a portion where the virtual image VI is displayed in the visual field VR, the user can see an external scene SC through the right optical panel 26 and the left optical panel 28. In the head mounted display HM in this embodiment, in the portion where the virtual image VI is displayed in the visual field VR of the user, the user can also see the external scene SC in the background of the virtual image VI.

A-2. User-side See-through Processing

Figure 5:
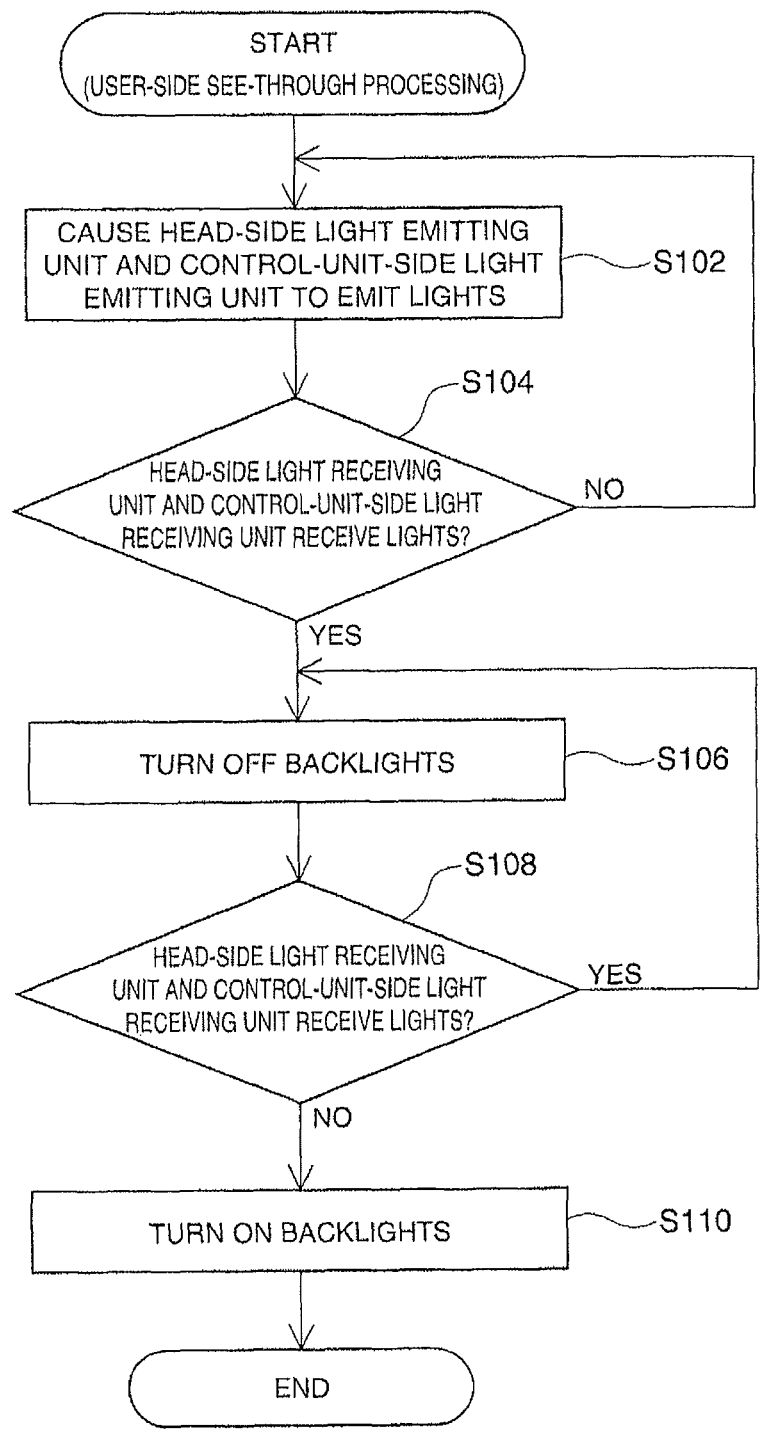
FIG. 5 is a flowchart for explaining a procedure of user-side see-through processing for the head mounted display.

FIG. 5 is a flowchart for explaining a procedure of the user-side see-through processing for the head mounted display HM. The user-side see-through processing is processing for erasing a virtual image displayed on the image display unit 20 when it is detected that the user faces the operation surface of the control unit 10, i.e., it is detected that the operation surface of the control unit 10 and the image display unit 20 are opposed to each other because the user attempts to operate the control unit 10. The user-side see-through processing is executed at any time after the head mounted display HM is started.

The direction determining unit 145 of the control unit 10 causes the head-side light emitting unit 61 and the control-unit-side light emitting unit 62 to emit lights (step S102). Specifically, the direction determining unit 145 of the control unit 10 alternately drives the head-side light emitting unit 61 and the control-unit-side light emitting unit 62 to thereby cause the head-side light emitting unit 61 and the control-unit-side light emitting unit 62 to alternately emit infrared rays. By causing the head-side light emitting unit 61 and the control-unit-side light emitting unit 62 to alternately emit infrared rays in this way, it is possible to suppress interference of the infrared ray from the head-side light emitting unit 61 and the infrared ray from the control-unit-side light emitting unit 62. A unit time in time division can be arbitrarily set.

The direction determining unit 145 determines whether the head-side light receiving unit 65 and the control-unit-side light receiving unit 66 receive the infrared rays (step S104). Specifically, the direction determining unit 145 determines whether the direction determining unit 145 receives both an output signal from the head-side light receiving unit 65 and an output signal from the control-unit-side light receiving unit 66 within a predetermined time. When the direction determining unit 145 receives both the output signals, the direction determining unit 145 determines that the head-side light receiving unit 65 and the control-unit-side light receiving unit 66 receive the infrared rays (YES in step S104). When the direction determining unit 145 does not receive at least one of the output signals, the direction determining unit 145 determines that the head-side light receiving unit 65 and the control-unit-side light receiving unit 66 do not receive the infrared rays (No in step S104). The predetermined time can be arbitrarily set. However, it is desirable to set the predetermined time twice or more as long as the unit time in step S102.

When the head-side light receiving unit 65 and the control-unit-side light receiving unit 66 do not receive the infrared rays (No in step S104), the direction determining unit 145 shifts the processing to step S102 and causes the head-side light emitting unit 61 and the control-unit-side light emitting unit 62 to emit lights. On the other hand, when the head-side light receiving unit 65 and the control-unit-side light receiving unit 66 receive the infrared rays (YES in step S104), the direction determining unit 145 turns off the backlights (step S106). Specifically, the direction determining unit 145 requests the display control unit 190 of the control unit 10 to turn off the backlights.

Figure 6:
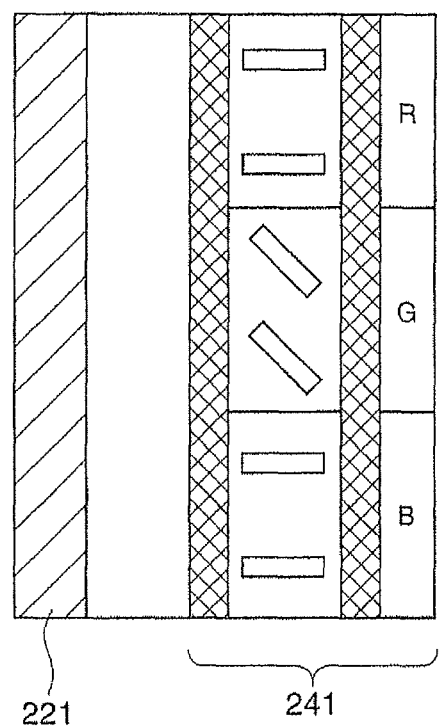
FIG. 6 is an explanatory diagram showing a state of the image-light generating unit in step S106 in FIG. 5.

FIG. 6 is an explanatory diagram showing a state of the image-light generating unit in step S106 in FIG. 5. In step S106 in FIG. 5, the display control unit 190 that receives the request from the direction determining unit 145 transmits a control signal indicating turn-off of the driving of the right backlight 221 by the right-backlight control unit 201 and a control signal indicating turn-off of the driving of the left backlight 222 by the left-backlight control unit 202 to the image display unit 20. The right-backlight control unit 201 that receives the signal turns off the right backlight 221. Similarly, the left-backlight control unit 202 that receives the signal turns off the left backlight 222. As a result, as shown in FIG. 6, images rendered on the right LCD 241 and the left LCD 242 are not emitted as image lights. Therefore, the display of the virtual image VI disappears from the visual field VR of the user.

After turning off the backlights, the direction determining unit 145 determines whether the head-side light receiving unit 65 and the control-unit-side light receiving unit 66 continue the reception of the infrared rays (step S108). The determination in step S108 is performed by the same method as step S104.

When the head-side light receiving unit 65 and the control-unit-side light receiving unit 66 continue the reception of the infrared rays (YES in step S108), the direction determining unit 145 shifts the processing to step S106 and continues the turned-off state of the backlights. On the other hand, when at least one of the head-side light receiving unit 65 and the control-unit-side light receiving unit 66 do not receive the infrared ray (YES in step S104), the direction determining unit 145 turns on the backlights (step S110). Specifically, the direction determining unit 145 requests the display control unit 190 of the control unit 10 to turn on the backlights and ends the processing.

In step S110 in FIG. 5, the display control unit 190 that receives the request from the direction determining unit 145 transmits a control signal indicating turn-on of the driving of the right backlight 221 by the right-backlight control unit 201 and a control signal indicating turn-on of the driving of the left backlight 222 by the left-backlight control unit 202 to the image display unit 20. The right-backlight control unit 201 that receives the signal turns on the right backlight 221. Similarly, the left-backlight control unit 202 that receives the signal turns on the left backlight 222. As a result, images rendered on the right LCD 241 and the left LCD 242 are emitted as image lights. The virtual image VI is displayed in the visual field VR of the user again.

Figure 7A:
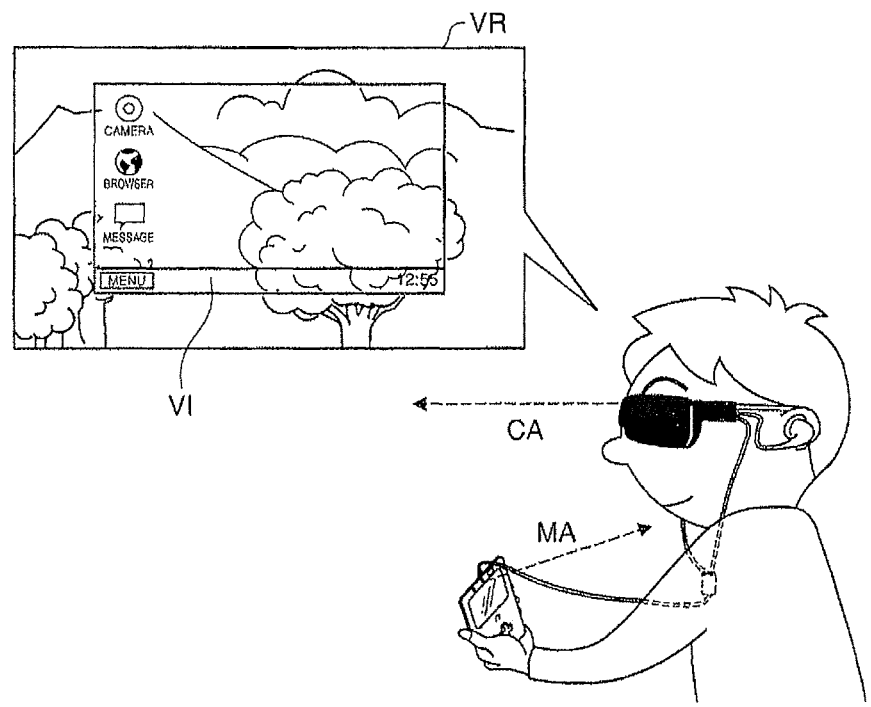
FIGS. 7A and 7B are explanatory diagrams showing states in which the user-side see-through processing (FIG. 5) is executed.
Figure 7B:
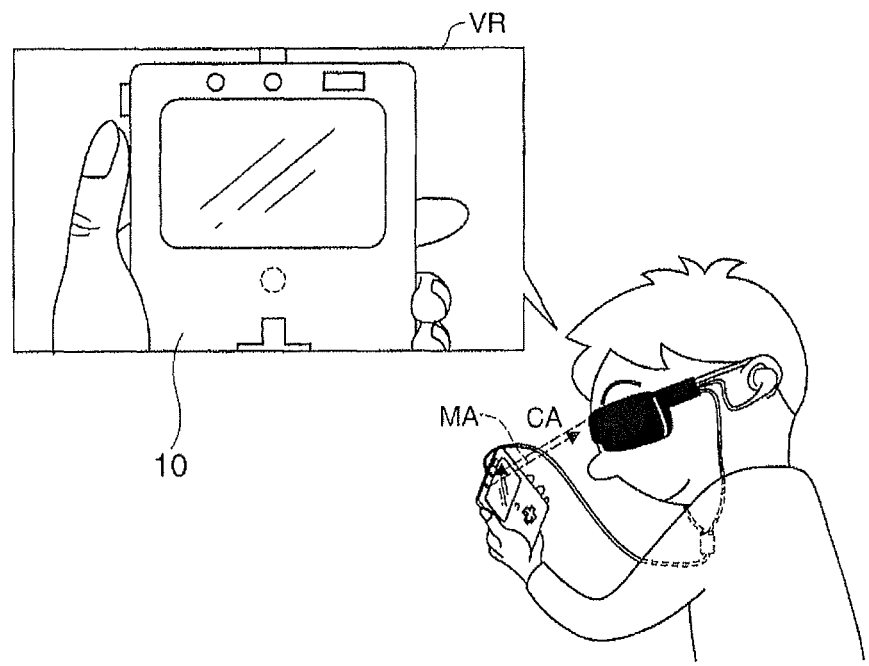

FIGS. 7A and 7B are explanatory diagrams showing states in which the user-side see-through processing (FIG. 5) is executed. FIG. 7A shows a state in which the user wearing the head mounted display HM faces a place other than the operation surface of the control unit 10. When the user wearing the head mounted display HM faces a place other than the operation surface of the control unit 10, both an infrared ray CA emitted from the head-side light emitting unit 61 of the image display unit 20 and an infrared ray MA emitted from the control-unit-side light emitting unit 62 of the control unit 10 are not received (No in step S104 in FIG. 5). Therefore, since the turn-off of the backlights in the user-side see-through processing (step S106) is not performed, the virtual image VI is displayed in the visual field VR of the user.

FIG. 7B shows a state in which the user wearing the head mounted display HM faces the operation surface of the control unit 10. When the user wearing the head mounted display HM faces the operation surface of the control unit 10, the infrared ray CA emitted from the head-side light emitting unit of the image display unit 20 is received by the control-unit-side light receiving unit 66 of the control unit 10. Similarly, the infrared ray MA emitted from the control-unit-side light emitting unit 62 of the control unit 10 is received by the head-side light receiving unit 65 of the image display unit 20 (YES in step S104 in FIG. 5). Therefore, the turn-off of the backlights in the user-side see-through processing (step S106) is performed and the display of the virtual image VI disappears from the visual field VR of the user. As a result of the disappearance of the virtual image VI that blocks the visual field VR, the user can clearly see an external scene, i.e., the operation surface of the control unit 10.

The state in which the user wearing the head mounted display HM faces the operation surface of the control unit 10 as shown in FIG. 7B, i.e., a state in which an optical panel surface of the image display unit 20 and the operation surface of the control unit 10 are opposed to each other is expressed as "the operation surface and the image display unit 20 are opposed to each other" as well.

When the right backlight 221 and the left backlight 222 include plural light emitting members (LEDs, etc.), for example, processing explained below may be performed in step S106 of the user-side see-through processing (FIG. 5).

Figure 8:
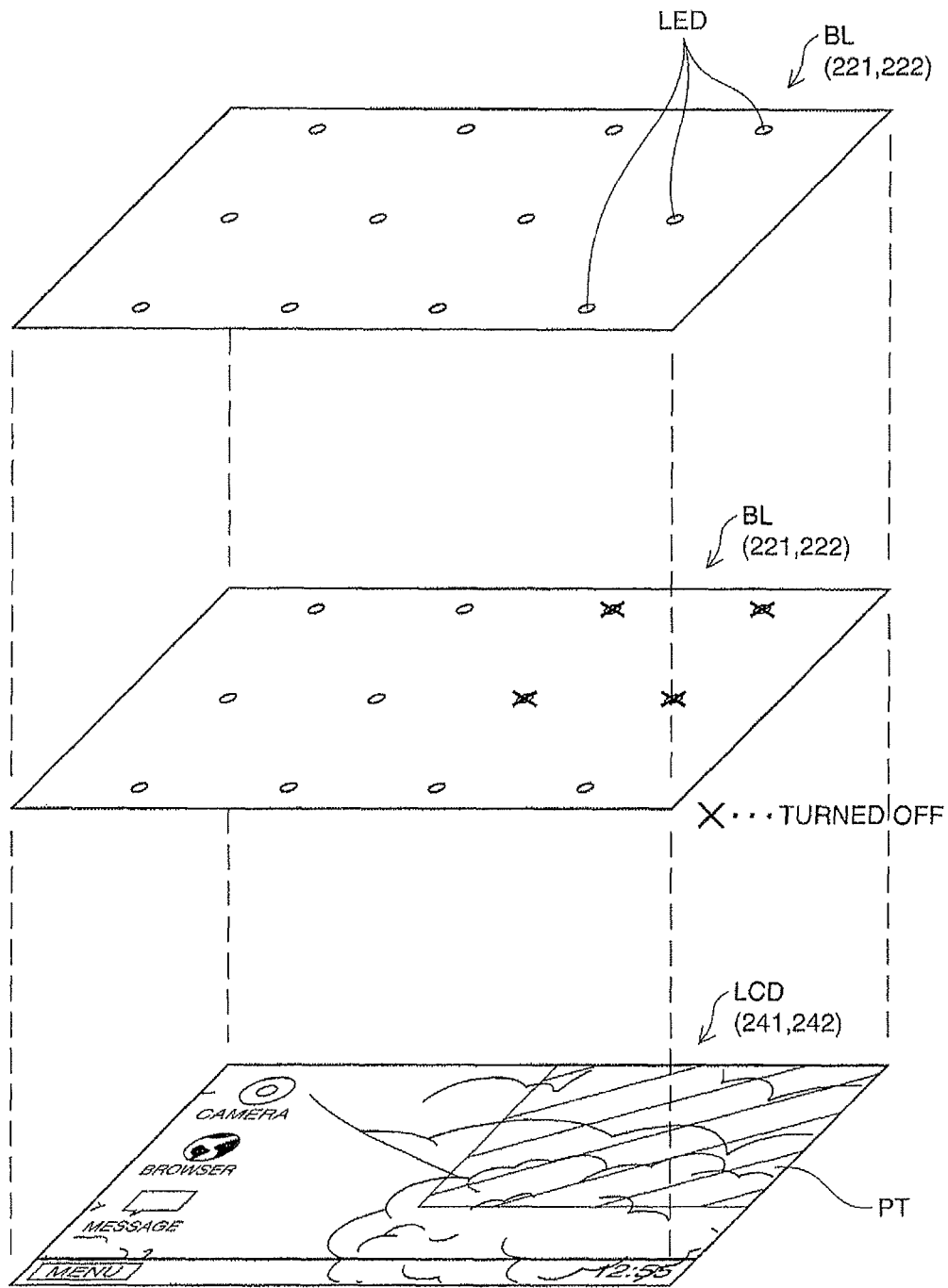
FIG. 8 is an explanatory diagram showing another processing form in step S106 of the user-side see-through processing (FIG. 5).

FIG. 8 is an explanatory diagram showing another processing form in step S106 of the user-side see-through processing (FIG. 5). The right backlight 221 and the left backlight 222 shown in FIG. 8 are light sources, each including twelve LEDs. In step S106 in FIG. 5, the direction determining unit 145 requests the display control unit 190 of the control unit 10 to turn off a part of the LEDs. The display control unit 190 that receives the request transmits identifiers for identifying the LEDs and control signals for designating turn-on and turn-off of driving of the LEDs to the right-backlight control unit 201 and the left-backlight control unit 202. The right-backlight control unit 201 that receives the signals turns off a designated part of the LEDs of the right backlight 221. Similarly, the left-backlight control unit 202 turns off a designated part of the LEDs of the left backlight 222.

As a result, as shown in FIG. 8, in images rendered on the right LCD 241 and the left LCD 242, images corresponding to a portion of a region PT in which the turned-off LEDs are arranged are not emitted as image lights. Therefore, the virtual image VI in another portion excluding the region PT is displayed in the visual field VR of the user. Consequently, the virtual image VI in a portion corresponding to the region PT in which the turned-off LEDs are arranged is not displayed. Therefore, it is possible to improve the visibility of an external scene in the portion of the region PT.

In FIG. 8, an operation explanation and a function explanation for the control unit 10 may be displayed in the other portion excluding the region PT. Then, the user can check the operation surface on the control unit 10 side referring to the operation explanation and the function explanation while keeping wearing the head mounted display HM. Therefore, it is possible to improve convenience.

Further, in step S106 of the user-side see-through processing (FIG. 5), the direction determining unit 145 may perform, for example, processing explained below instead of turning off the backlights.

In step S106 in FIG. 5, the direction determining unit 145 requests the display control unit 190 of the control unit 10 to reduce the luminance of the backlights. The display control unit 190 that receives the request transmits, together with a control signal for designating turn-on and turn-off of driving of the backlights, a control signal for designating the luminance of the backlights to the right-backlight control unit 201 and the left-backlight control unit 202. As the control signal for designating the luminance of the backlights, for example, a PWM (Pulse Width Modulation) signal can be used. Consequently, in step S106, a reduction of the illumination light by the backlights (the right backlight 221 and the left backlight 222) is performed instead of the turn-off of the backlights. If the illumination light is reduced, since the image light emitted by the image-light generating unit becomes feeble (the luminance of the image-light generating unit decreases), the virtual image VI displayed in the visual field VR of the user is displayed pale and blurred. Therefore, the user can easily visually recognize an external scene, i.e., the operation surface of the control unit 10.

In step S106 in FIG. 5, the direction determining unit 145 requests the display control unit 190 of the control unit 10 to reduce an aperture ratio of the LCDs (liquid crystals). The display control unit 190 that receives the request transmits a control signal for designating an aperture ratio of the LCDs to the right-LCD control unit 211 and the left-LCD control unit 212. Consequently, in step S106, a reduction of the aperture ratio of the LCDs (the right LCD 241 and the left LCD 242) is performed instead of the turn-off of the backlights. If the liquid crystal aperture ratio is reduced, since the image light emitted by the image-light generating unit becomes feeble, the virtual image VI displayed in the visual field VR of the user is displayed pale and blurred. Therefore, the user can easily visually recognize an external scene, i.e., the operation surface of the control unit 10.

In step S106 in FIG. 5, the direction determining unit 145 requests the image processing unit 160 of the control unit 10 to change the image data Data to dummy data of a single color black. The image processing unit 160 that receives the request changes the image data Data to be transmitted to the image display unit 20 to the dummy data of the single color black. Consequently, in step S106, images rendered on the LCDs (the right LCD 241 and the left LCD 242) are adjusted to dummy images of the single color black. The image-light generating unit emits image light corresponding to the dummy images. Therefore, the virtual image VI displayed in the visual field VR of the user is displayed as if the virtual image VI disappears. Therefore, the user can easily visually recognize an external scene, i.e., the operation surface of the control unit 10. The image processing unit 160 may replace at least a part of the image data Data with the dummy data of the single color black rather than the entire image data Data.

As explained above, according to the first embodiment, the direction determining unit 145 assumes that the user shifts the user's attention from the virtual image. Specifically, the direction determining unit 145 determines whether the user faces the operation surface of the control unit 10. When the direction determining unit 145 determines that the user faces the operation surface, the control unit 10 adjusts the luminance of the image-light generating unit or adjusts the image light PL generated by the image-light generating unit to reduce the visibility of the virtual image VI. Therefore, in the head mounted display HM, it is possible to detect, with a configuration different from that in the past, that the user attempts to operate the control unit 10 of the head mounted display HM. It is possible to improve the visibility of the external scene SC in the image display unit 20.

Specifically, the head-side light emitting unit 61 that emits invisible light (an infrared ray) is arranged in the image display unit 20. The control-unit-side light receiving unit 66 that receives the emitted invisible light is arranged on the operation surface of the control unit 10. The control-unit-side light emitting unit 62 that emits invisible light (an infrared ray) is further arranged on the operation surface of the control unit 10. The head-side light receiving unit 65 that receives the emitted invisible light is further arranged in the image display unit 20. The control unit 10 causes the head-side light emitting unit 61 and the control-unit-side light emitting unit 62 to alternately emit the invisible light. The direction determining unit 145 determines, using an output signal of the control-unit-side light receiving unit 66 and an output signal of the head-side light receiving unit 65, whether the operation surface of the control unit 10 and the image display unit 20 are opposed to each other. When the user attempts to operate the control unit 10 of the head mounted display HM, the user looks at the operation surface of the control unit 10, i.e., the user faces the operation surface (i.e., the image display unit 20 mounted on the head of the user and the operation surface are opposed to each other). Therefore, the direction determining unit 145 can determine whether the user faces the operation surface by determining whether the operation surface of the control unit 10 and the image display unit 20 are opposed to each other as explained above.

When the direction determining unit 145 determines that the user faces the operation surface (i.e., the operation surface of the control unit 10 and the image display unit 20 are opposed to each other), by turning off or reducing the illumination light IL of the light sources (the right backlight 221 and the left backlight 222), the control unit 10 can adjust the luminance of the image-light generating unit to reduce the visibility of the virtual image VI. When the direction determining unit 145 determines that the user faces the operation surface (i.e., the operation surface of the control unit 10 and the image display unit 20 are opposed to each other), by replacing at least a part of the image data Data to be transmitted to the image-light generating unit with dummy data indicating black, the control unit 10 can adjust the image light PL generated by the image-light generating unit to reduce the visibility of the virtual image VI. When the direction determining unit 145 determines that the user faces the operation screen (i.e., the operation surface of the control unit 10 and the image display unit 20 are opposed to each other), by reducing a liquid crystal aperture ratio of at least a part of the display devices (the right LCD 241 and the left LCD 242), the control unit 10 can adjust the image light PL generated by the image-light generating unit to reduce the visibility of the virtual image VI. In this way, the visibility of the virtual image VI that blocks the visual field VR of the user is reduced. As a result, the visibility of an external scene in the image display unit 20 can be improved. The user can clearly see the external scene, i.e., the operation surface of the control unit 10.

Further, according to this embodiment, infrared ray emitting units that emit infrared rays are used as the head-side light emitting unit 61 and the control-unit-side light emitting unit 62 and infrared ray receiving units that receive the emitted infrared rays are used as the head-side light receiving unit 65 and the control-unit-side light receiving unit 66. Therefore, it is possible to realize, at low cost, the head mounted display HM in which the visibility of an external scene in the image display unit 20 is improved with a configuration different from that in the past.

Further, according to this embodiment, sets of light emitting units and light receiving units are respectively arranged in the control unit 10 and the image display unit 20. The control unit 10 causes two light emitting units (the head-side light emitting unit 61 and the control-unit-side light emitting unit 62) to alternately emit invisible light (infrared rays). The direction determining unit 145 determines, using output signals from the two light receiving units (the control-unit-side light receiving unit 66 and the head-side light receiving unit 65), whether the operation surface of the control unit 10 and the image display unit 20 are opposed to each other. Therefore, it is possible to suppress wrong determination and improve accuracy of the determination by the direction determining unit 145.

B. Second Embodiment

In a second embodiment of the invention, a configuration that can improve reliability and power saving properties in user-side see-through processing is explained. In the following explanation, only components having configurations and operations different from those in the first embodiment are explained. In the figures, components same as those in the first embodiment are denoted by reference numerals and signs same as those in the first embodiment explained above and detailed explanation of the components is omitted.

B-1. Configuration of a Head-mounted Display Device

Figure 9:
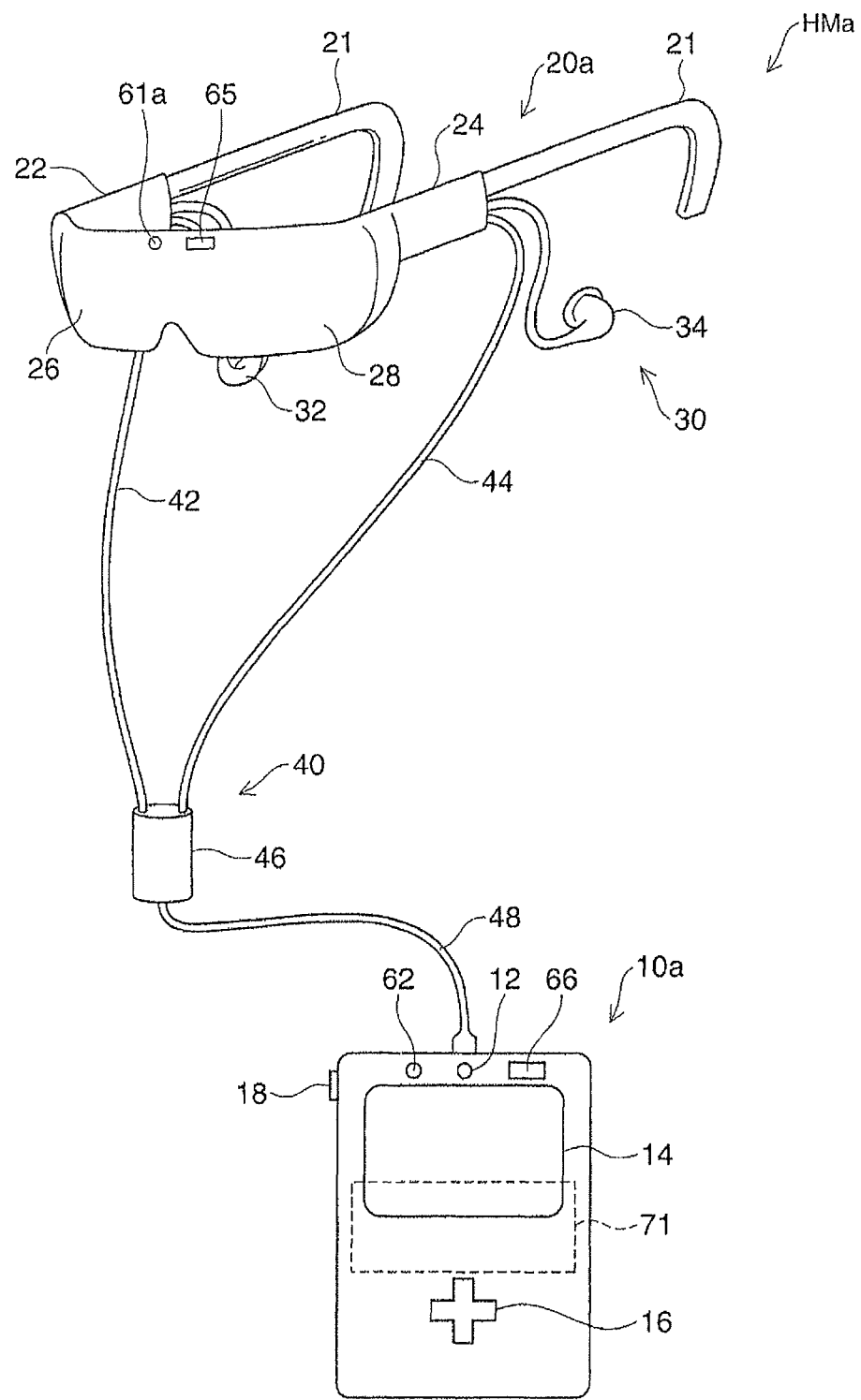
FIG. 9 is an explanatory diagram showing the configuration of the exterior of a head mounted display in a second embodiment.
Figure 10:
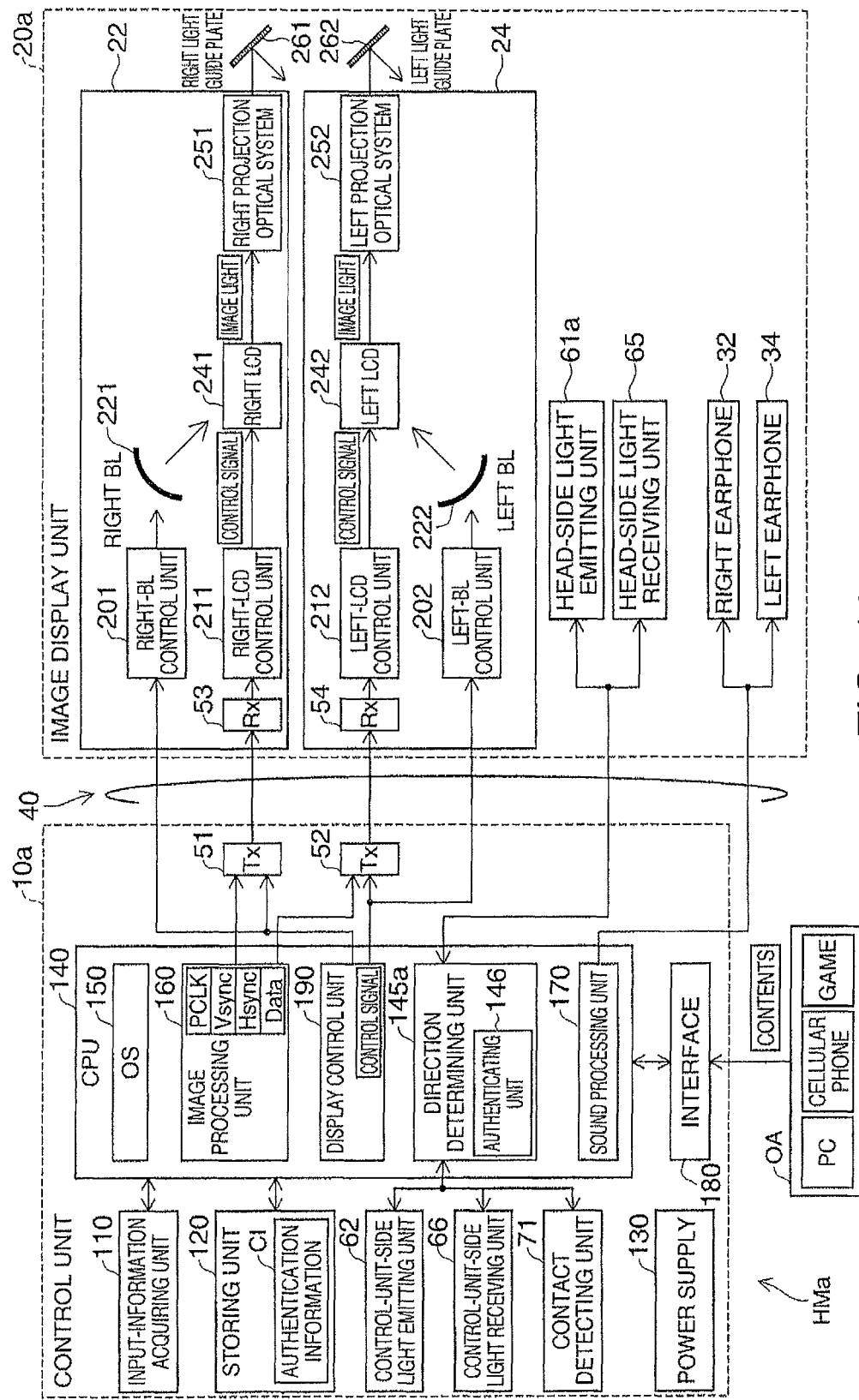
FIG. 10 is a functional block diagram showing the configuration of the head mounted display in the second embodiment.

FIG. 9 is an explanatory diagram showing the configuration of the exterior of a head mounted display HMa in the second embodiment. FIG. 10 is a functional block diagram showing the configuration of the head mounted display HMa in the second embodiment. The head mounted display HMa is different from the head mounted display HM in the first embodiment shown in FIGS. 1 and 2 in that the head mounted display HMa includes a control unit 10a instead of the control unit 10 and includes an image display unit 20a instead of the image display unit 20.

The image display unit 20a includes a head-side light emitting unit 61a instead of the head-side light emitting unit 61. The head-side light emitting unit 61a has a function of emitting an infrared ray, which is invisible light. The head-side light emitting unit 61a emits an infrared ray having a signal pattern including identification information of the image display unit 20a by pulse-modulating an infrared ray to be emitted. The identification information is information including an arbitrary character string for identifying the image display unit 20a.

The control unit 10a includes a direction determining unit 145a instead of the direction determining unit 145 and includes a contact detecting unit 71. Authentication information CI is stored in the storing unit 120 of the control unit 10a. The contact detecting unit 71 is arranged on a surface on the opposite side of an operation surface of the control unit 10a and in a portion (e.g., the center or the left and right ends) with which the hand of the user is assumed to come into contact when the user performs operation holding the control unit 10a. The contact detecting unit 71 in this embodiment includes a touch sensor and detects contact by the user. As the touch sensor, touch sensors of various systems can be adopted. The direction determining unit 145a includes an authenticating unit 146. Details of the authenticating unit 146 are explained later. In the authentication information CI stored in the storing unit 120, identification information of the image display unit 20a connected to the control unit 10a is stored in advance.

B-2. User-side See-through Processing

Figure 11:
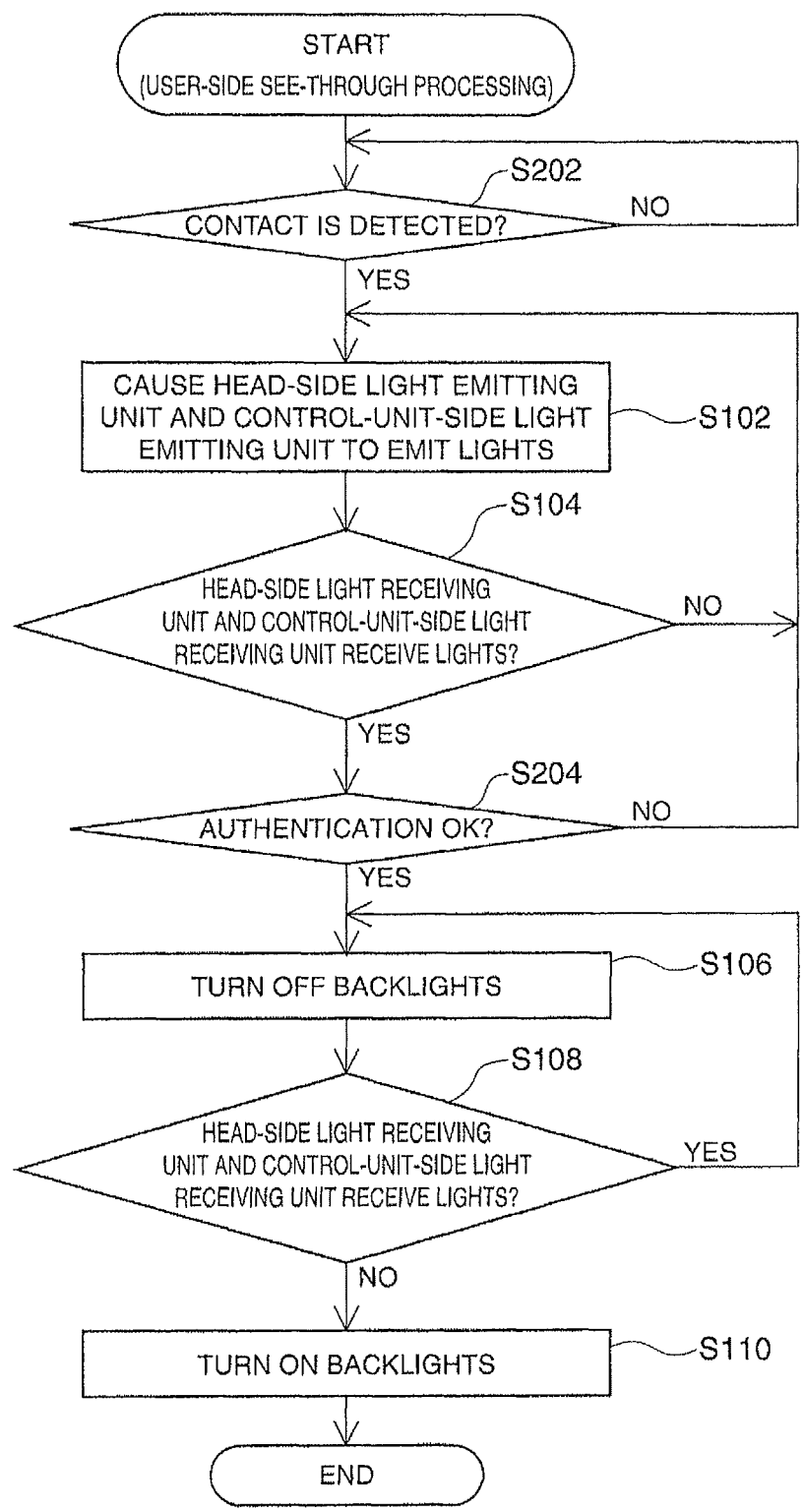
FIG. 11 is a flowchart for explaining a procedure of user-side see-through processing for the head mounted display in the second embodiment.

FIG. 11 is a flowchart for explaining a procedure of the user-side see-through processing for the head mounted display HMa in the second embodiment. The flowchart is different from the flowchart in the first embodiment shown in FIG. 5 in that the flowchart further includes steps S202 and S204. The other actions are the same as those in the first embodiment. First, the direction determining unit 145a determines, according to an output signal from the contact detecting unit 71, whether contact with the control unit 10a is detected (step S202). When the contact is not detected, the direction determining unit 145a shifts the processing to step S202. On the other hand, when the contact is detected the direction determining unit 145a shifts the processing to step S204 and drives the head-side light emitting unit 61a and the control-unit-side light emitting unit 62.

When the direction determining unit 145a determines in step S104 that the direction determining unit 145a receives both an output signal from the head-side light receiving unit 65 and an output signal from the control-unit-side light receiving unit 66, the authenticating unit 146 of the direction determining unit 145a performs authentication of the image display unit 20a (step S204). Specifically, the authenticating unit 146 performs the authentication of the image display unit 20a by performing a search as to whether identification information of the image display unit 20a acquired from the output signal from the control-unit-side light receiving unit 66 coincides with the identification information in the authentication information CI stored in the storing unit 120. When the identification information included in the output signal coincides with the identification information in the authentication information CI, the authenticating unit 146 determines that the authenticating unit 146 succeeds in the authentication of the image display unit 20a (YES in step S204). On the other hand, when the identification information included in the output signal does not coincide with the identification information in the authentication information CI, the authenticating unit 146 determines that the authenticating unit 146 fails in the authentication of the image display unit 20a (NO in step S204). When the authenticating unit 146 fails in the authentication, the direction determining unit 145a shifts the processing to step S102 and causes the head-side light emitting unit 61a and the control-unit-side light emitting unit 62 to emit lights. On the other hand, when the authenticating unit 146 succeeds in the authentication, the direction determining unit 145a shifts the processing to step S106 and turns off the backlights.

As explained above, according to the second embodiment, the contact detecting unit 71 for detecting contact with the control unit 10a is arranged in the control unit 10a. When the contact with the control unit 10a is detected, the direction determining unit 145a of the control unit 10a causes the head-side light emitting unit 61a to emit an infrared ray and causes the control-unit-side light emitting unit 62 to emit an infrared ray. When the user attempts to operate the head mounted display HMa, in general, the user holds the control unit 10a. Therefore, according to the second embodiment, it is possible to reduce power consumption of the head mounted display HMa compared with the configuration in which infrared rays are always emitted by the light emitting units (the head-side light emitting unit 61 and the control-unit-side light emitting unit 62).

Further, according to the second embodiment, the identification information for identifying the image display unit 20a is included in the infrared ray emitted by the head-side light emitting unit 61a. The authenticating unit 146 can authenticate the image display unit 20a by acquiring the identification information for the image display unit 20a from the output signal of the control-side light receiving unit and performing a search as to whether the acquired identification information is included in the authentication information CI stored in advance. Therefore, it is possible to suppress an infrared ray emitted from another apparatus, which can emit an infrared ray, from being detected by mistake (misrecognition) in a public space or the like and improve reliability in the user-side see-through processing. As explained above, according to the second embodiment, in the head mounted display HMa, it is possible to further improve reliability and power saving properties of the user-side see-through processing.

C. Third Embodiment

In a third embodiment of the invention, a configuration for performing, instead of the user-side see-through processing, movement detection processing for detecting the movement of the head exceeding a fixed amount of a user wearing an image display unit is explained. In the following explanation, only components having configurations and operations different from those in the first embodiment are explained. In the figures, components same as those in the first embodiment are denoted by reference numerals and signs same as those in the first embodiment explained above and detailed explanation of the components is omitted.

C-1. Configuration of a Head-mounted Display Device

Figure 12:
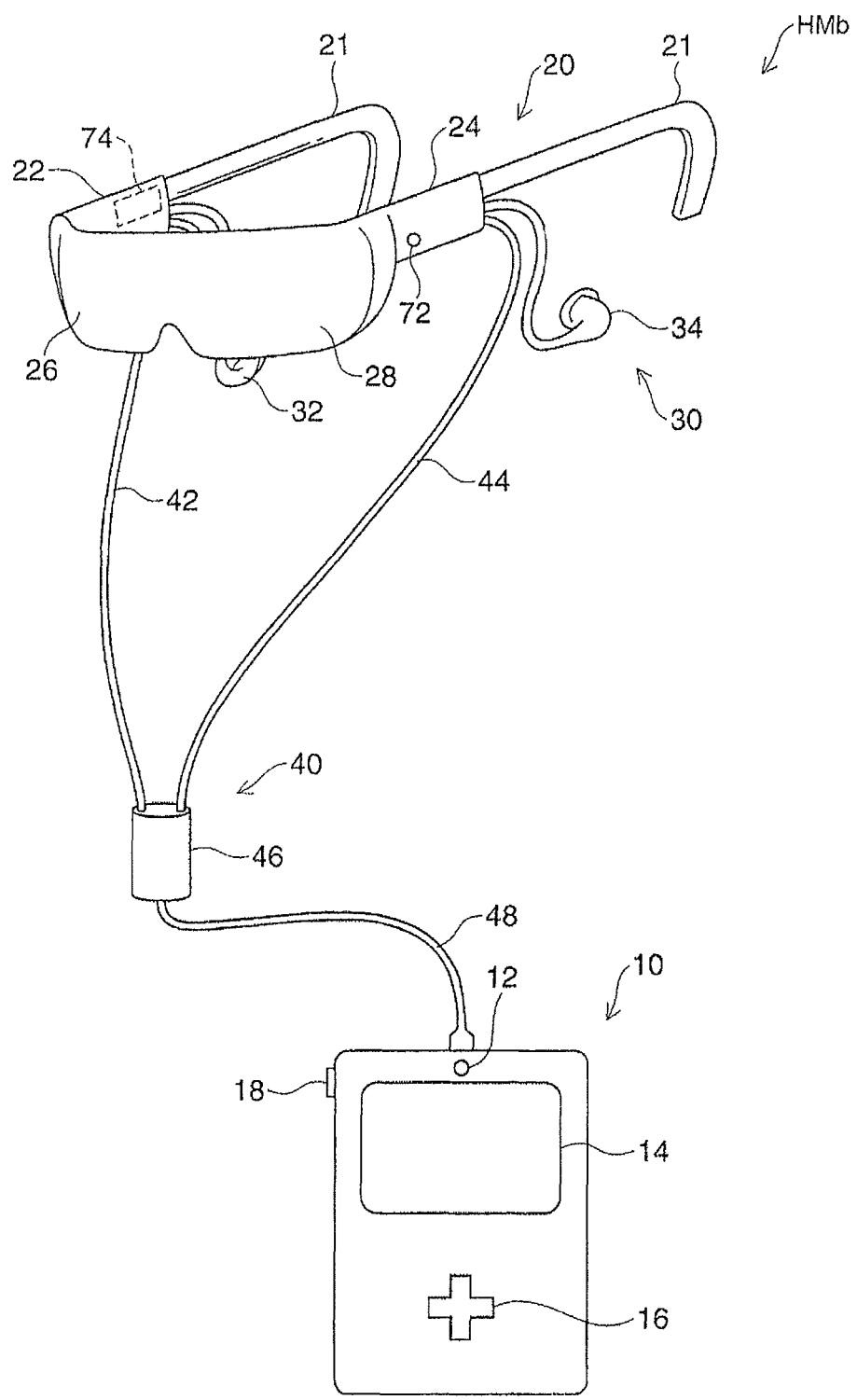
FIG. 12 is an explanatory diagram showing the configuration of the exterior of a head-mounted display in a third embodiment.
Figure 13:
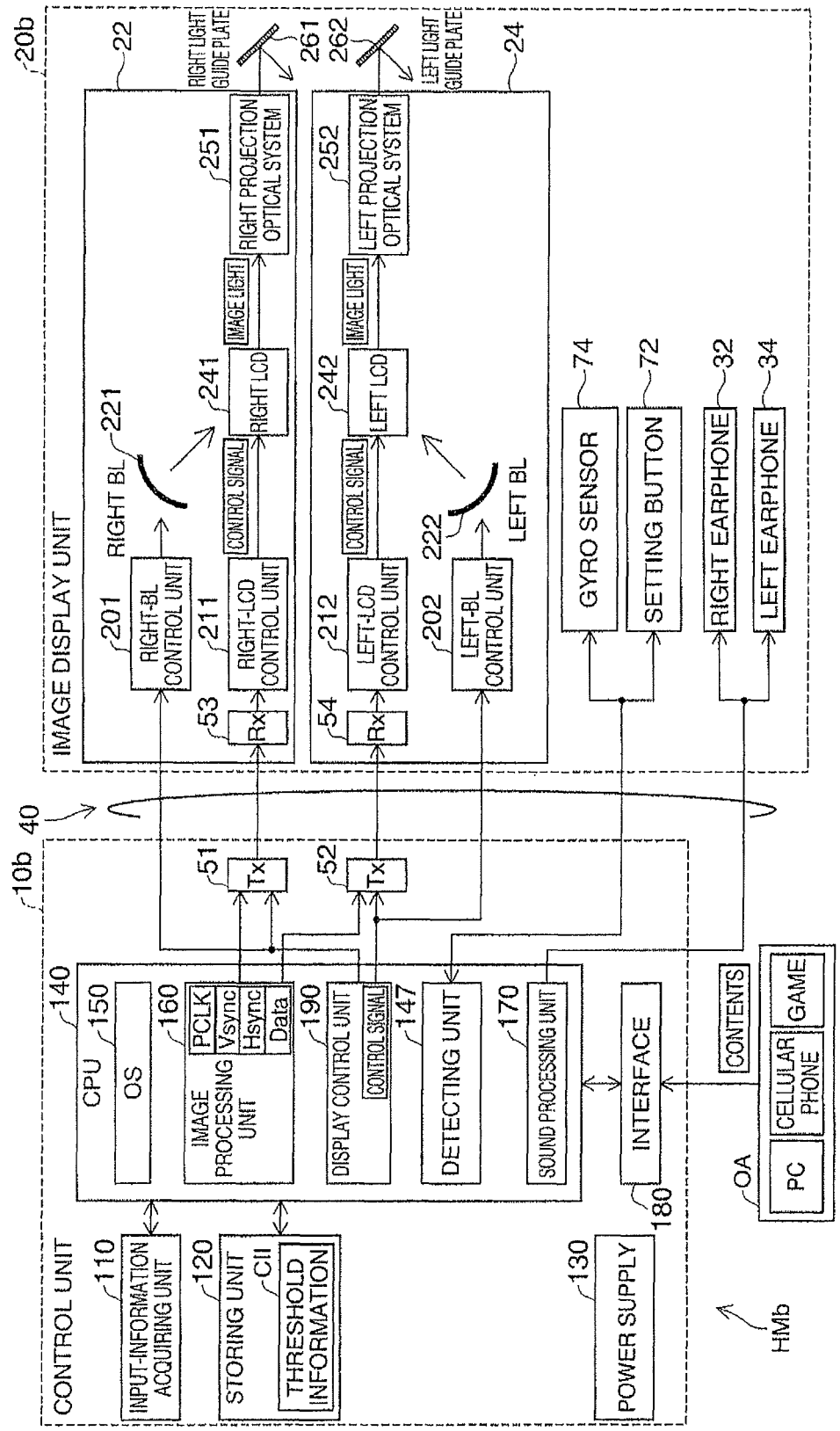
FIG. 13 is a functional block diagram showing the configuration of a head mounted display in the third embodiment.

FIG. 12 is an explanatory diagram showing the configuration of the exterior of a head-mounted display device according to the third embodiment. FIG. 13 is a functional block diagram of the configuration of a head mounted display HMb in the third embodiment. The head mounted display HMb is different from the head mounted display HM in the first embodiment shown in FIGS. 1 and 2 in that the head mounted display HMb includes a control unit 10b instead of the control unit 10 and includes an image display unit 20b instead of the image display unit 20.

In the control unit 10b, threshold information CII is stored in the storing unit 120 instead of the authentication information CI. The threshold information CII is a threshold used in movement detection processing (explained later). In this embodiment, two thresholds (a first threshold and a second threshold) are stored in advance. The control unit 10b includes, in the CPU 140, a detecting unit 147 instead of the direction determining unit 145. The control unit 10b does not include the control-unit-side light emitting unit 62 and the control-unit-side light receiving unit 66.

The detecting unit 147 acquires change information (in this embodiment, an angular velocity, which is a detection value of a gyro sensor 74), indicating a change in the direction of the image display unit 20b, and executes the movement detection processing using the change information. The movement detection processing is processing for detecting the movement of the head exceeding a fixed amount of a user wearing the image display unit 20b of the head mounted display HMb and erasing a virtual image displayed on the image display unit 20b. Details of the movement detection processing are explained later. The detecting unit 147 corresponds to "detecting unit" in the appended claims.

The image display unit 20a includes a gyro sensor 74 and a setting button 72 instead of the head-side light emitting unit 61 and the head-side light receiving unit 65.

The gyro sensor 74 functioning as an angular-velocity detecting unit is arranged on the inside of a housing of the right display unit 22. The gyro sensor 74 in this embodiment is a two-axis angular velocity sensor of a piezoelectric vibration type. The gyro sensor 74 detects angular velocities on two axes (an x axis and a y axis) of the image display unit 20b. The setting button 72 is arranged on the surface of a housing of the left display unit 24, which is the surface on the outer side of the image display unit 20b (i.e., a surface on the opposite side of a mounting side of the image display unit 20b). The setting button 72 is used for setting an initial position that should be a reference in detecting the direction of the image display unit 20b in the movement detection processing explained later. Details of the setting button 72 are explained later.

C-2. Movement Detection Processing

Figure 14A:
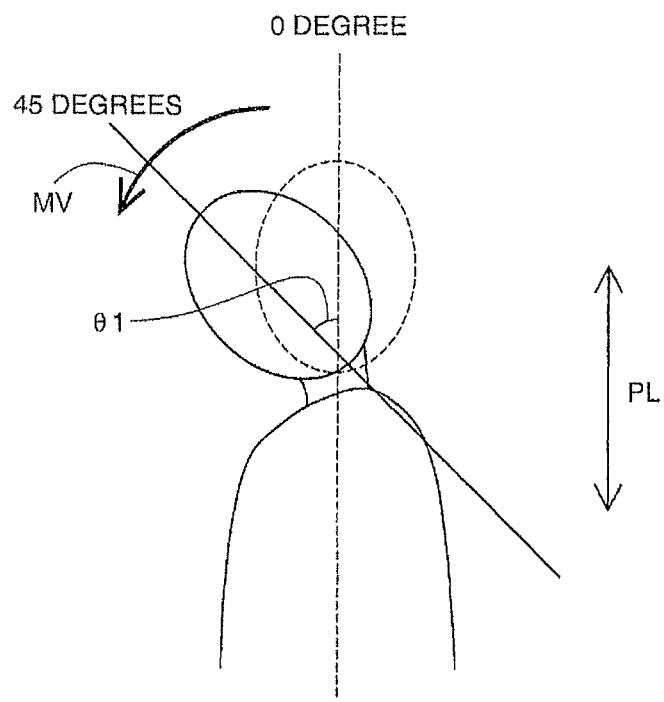
FIGS. 14A and 14B are explanatory diagrams for explaining movement detection processing.
Figure 14B:
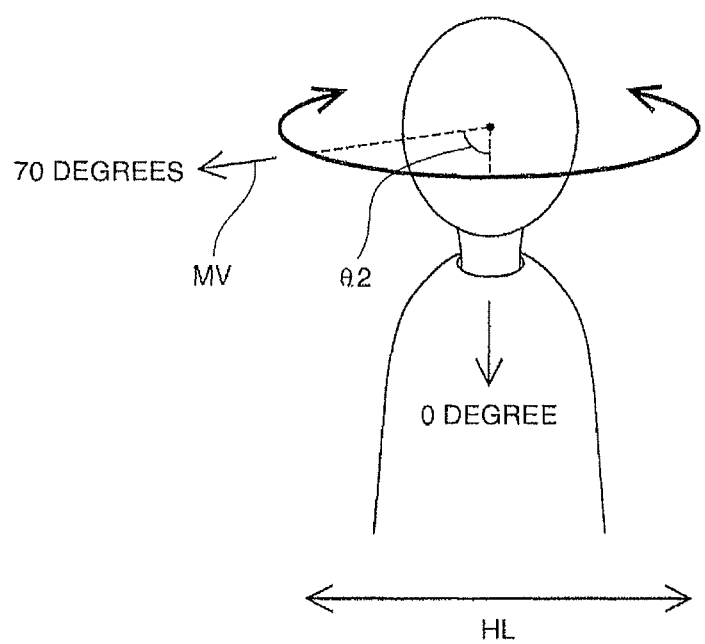

FIGS. 14A and 14B are explanatory diagrams for explaining the movement detection processing. The movement detection processing for the head mounted display HMb is processing for detecting the movement of the head exceeding a fixed amount of a user wearing the image display unit 20b and erasing a virtual image displayed on the image display unit 20b. The "movement of the head exceeding a fixed amount" means that the head of the user wearing the image display unit 20b (i.e., the image display unit 20b) moves exceeding a fixed amount with respect to the initial position. In this embodiment, the initial position and a movement amount of the movement of the head are specified by a combination of the angle of the head and the direction of the face of the user wearing the image display unit 20b at the time when the setting button 72 is pressed.

As shown in FIG. 14A, the angle of the head corresponds to the movement of the head in a perpendicular direction (a vertical direction) PL of the user. For example, when the setting button 72 is pressed when the head of the user is in a perpendicular state (0 degree), 0 degree is set as the initial position. In this state, when the user turns the head to an MV direction, a movement amount of the movement of the head (an angle θ1 of the head) is 45 degrees, which is a difference between the initial position (0 degree) and a position (45 degrees) after the movement. The movement amount (the angle θ1 of the head) of the movement of the head corresponds to the angular velocity of the y axis obtained from an output value of the gyro sensor 74.

As shown in FIG. 14B, the direction of the face corresponds to the movement of the face in the horizontal direction HL of the user. For example, when the setting button 72 is pressed when the face of the user faces the front (0 degree), 0 degree is set as the initial position. In this state, when the user turns the face to the MV direction, a movement amount of the movement of the head (a direction θ2 of the face) is 70 degrees, which is a difference between the initial position (0 degree) and a position (70 degrees) after the movement. The movement amount of the movement of the head (the direction θ2 of the face) corresponds to the angular velocity of the x axis obtained from an output value of the gyro sensor 74.

Figure 15:
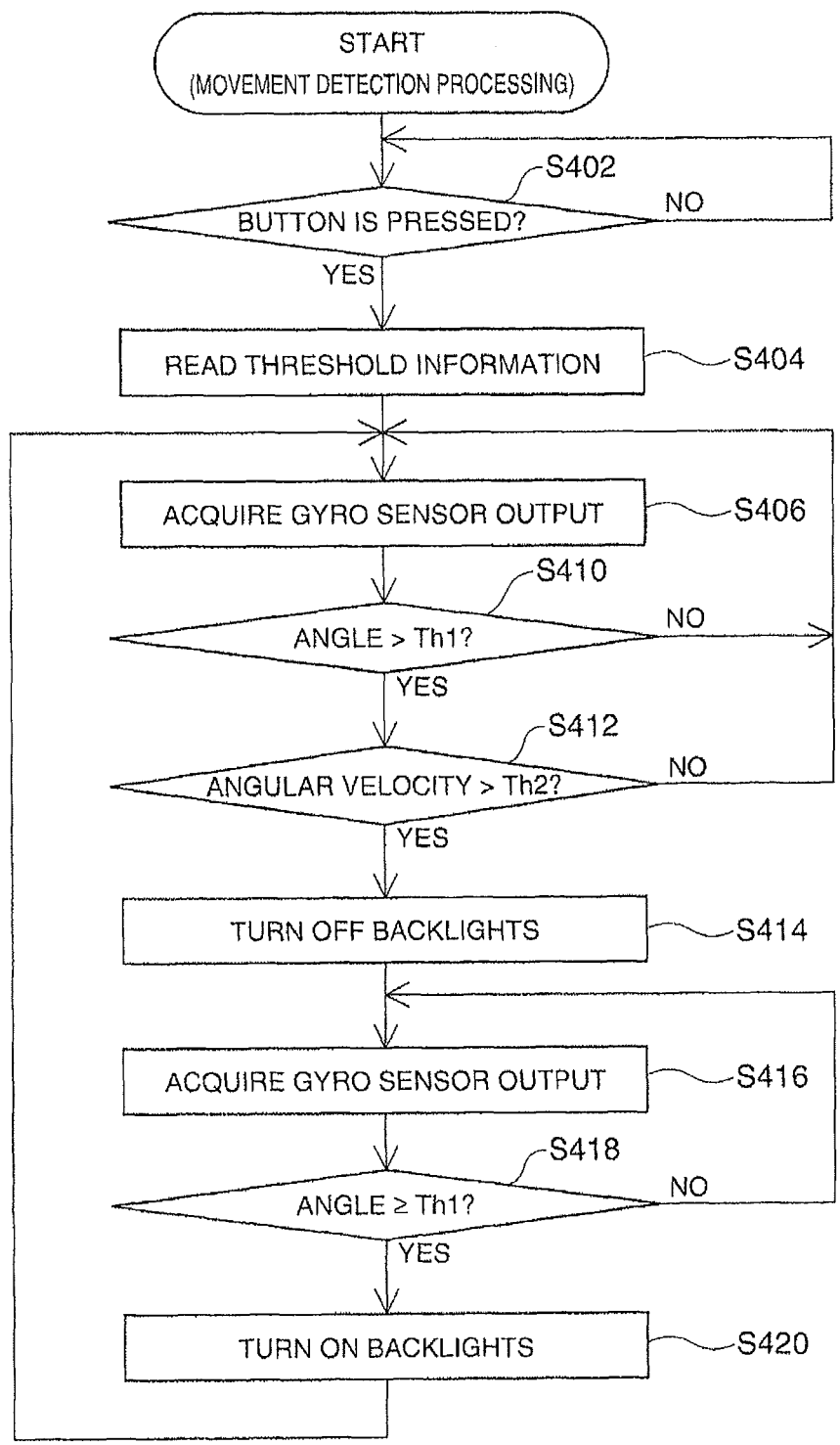
FIG. 15 is a flowchart for explaining a procedure of the movement detection processing.

FIG. 15 is a flowchart for explaining a procedure of the movement detection processing. The detecting unit 147 determines whether the setting button 72 provided in the image display unit 20b is pressed (step S402). When the setting button 72 is not pressed (No in step S402), the detecting unit 147 transitions to step S402 and continues to monitor whether the setting button 72 is pressed. When the setting button 72 is pressed (YES in step S402), the detecting unit 147 reads the first threshold and the second threshold from the threshold information CII stored in the storing unit 120 (step S404).

After acquiring the thresholds, the detecting unit 147 acquires an output value of the gyro sensor 74 (step S406). The detecting unit 147 determines whether at least one of the angle of the x axis and the angle of the y axis obtained from the acquired output value exceeds a first threshold Th1 (step S410). The detecting unit 147 integrates the angular velocity of the x axis and the angular velocity of the y axis to calculate the angle of the x axis and the angle of the y axis. When both the angles of the x axis and the y axis are equal to or smaller than the first threshold Th1 (NO in step S410), the detecting unit 147 shifts the processing to step S406 and acquires an output value of the gyro sensor 74 again.

On the other hand, when at least one of the angles of the x axis and the y axis exceeds the first threshold Th1 (YES in step S410), the detecting unit 147 determines whether at least one of the angular velocity of the x axis and the angular velocity of the y axis exceeds a second threshold Th2 (step S412). When both the angular velocities of the x axis and the y axis are equal to or smaller than the second threshold Th2 (NO in step S412), the detecting unit 147 shifts the processing to step S406 and acquires an output value of the gyro sensor 74 again.

On the other hand, when at least one of the angular velocities of the x axis and the y axis exceeds the second threshold Th2 (YES in step S412), the detecting unit 147 turns off the backlights (step S414). Specifically, the detecting unit 147 requests the display control unit 190 of the control unit 10b to turn off the backlights.

Figure 16:
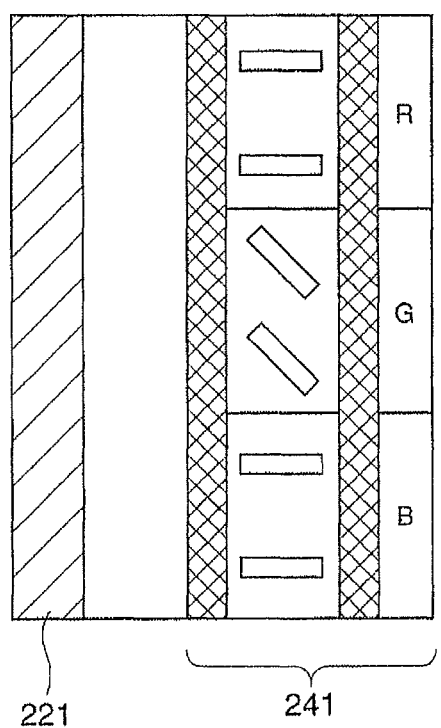
FIG. 16 is an explanatory diagram showing a state of an image-light generating unit in step S414 in FIG. 15.

FIG. 16 is an explanatory diagram showing a state of the image-light generating unit in step S414 in FIG. 15. In step S414 in FIG. 15, the display control unit 190 that receives the request from the detecting unit 147 transmits a control signal indicating turn-off of the driving of the right backlight 221 by the right-backlight control unit 201 and a control signal indicating turn-off of the driving of the left backlight 222 by the left-backlight control unit 202 to the image display unit 20b. The right-backlight control unit 201 that receives the signal turns off the right backlight 221. Similarly, the left-backlight control unit 202 that receives the signal turns off the left backlight 222. As a result, as shown in FIG. 16, since images rendered on the right LCD 241 and the left LCD 242 are not emitted as image lights, the display of the virtual image VI disappears from the visual field VR of the user.

After turning off the backlights, the detecting unit 147 acquires an output value of the gyro sensor 74 (step S416). The detecting unit 147 determines whether at least one of the angle of the x axis and the angle of the y axis obtained from the acquired output value is equal to or larger than the first threshold Th1 (step S418). When both the angles of the x axis and the y axis are smaller than the first threshold Th1 (NO in step S418), the detecting unit 147 shifts the processing to step S416 and acquires an output value of the gyro sensor 74 again.

On the other hand, when at least one of the angles of the x axis and the y axis is equal to or larger than the first threshold Th1 (YES in step S418), the detecting unit 147 turns on the backlights (step S420). Specifically, the detecting unit 147 requests the display control unit 190 of the control unit 10b to turn on the backlights and ends the processing.

In step S420 in FIG. 15, the display control unit 190 that receives the request from the detecting unit 147 transmits a control signal indicating turn-on of the driving of the right backlight 221 by the right-backlight control unit 201 and a control signal indicating turn-on of the driving of the left backlight 222 by the left-backlight control unit 202 to the image display unit 20b. The right-backlight control unit 201 that receives the signal turns on the right backlight 221.

Similarly, the left-backlight control unit 202 that receives the signal turns on the left backlight 222. As a result, images rendered on the right LCD 241 and the left LCD 242 are emitted as image lights. The virtual image VI is displayed in the visual field VR of the user again.

In this way, according to the pressing of the setting button 72, step S404 and subsequent steps of the movement detection processing (FIG. 15) are started and the monitoring of an output value of the gyro sensor 74 is started. The gyro sensor 74 is a sensor that detects angular velocity, i.e., a change amount of an angle (i.e., a change in a direction) per a unit time. Therefore, it can be said that the detecting unit 147 sets, according to the pressing of the setting button 72, the angle of the head and the direction of the face of the user at that point in the initial position of the image display unit 20*b* (a position serving as a reference in detecting the movement of the image display unit 20*b*) and the gyro sensor 74 detects angular velocity indicating a change in the direction of the image display unit 20*b* with respect to the initial position. The angular velocity detected by the gyro sensor 74 corresponds to "change information" in the appended claims.

The first and second thresholds stored in the threshold information CII in advance can be arbitrarily set. The first threshold serving as a threshold for an angle can be set to, for example, 45 degrees. By limiting a change in an angle with the first threshold, in the movement detection processing, it is possible to detect "the movement of the head exceeding a fixed amount" of the user wearing the image display unit 20*b*. In other words, when a change in the angle of the image display unit 20*b* occurs, it is possible to determine whether the user turns the user's face away from the initial position and the movement of the head exceeding the fixed amount occurs or the head of the user only slightly moves.

The second threshold serving as a threshold for angular velocity (a change amount of an angle per a unit time) is desirably set to a small value. By limiting a change in angular velocity with the second threshold, in the movement detection processing, it is possible to neglect (allow) slow movement of the user wearing the image display unit 20*b* and continue the display of the virtual image VI. The user may be allowed to arbitrary change the threshold information CII.

Figure 17A:
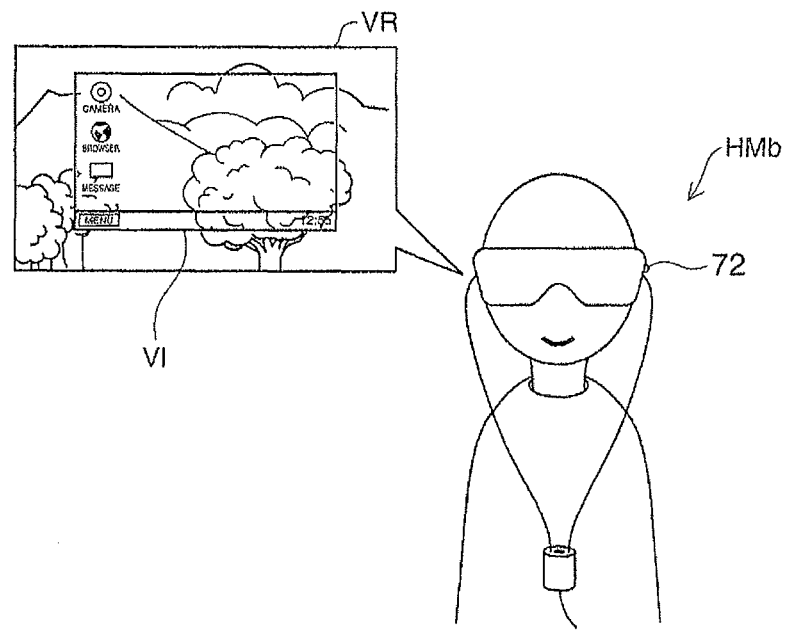
FIGS. 17A and 17B are explanatory diagrams showing states in which the movement detection processing is executed.
Figure 17B:
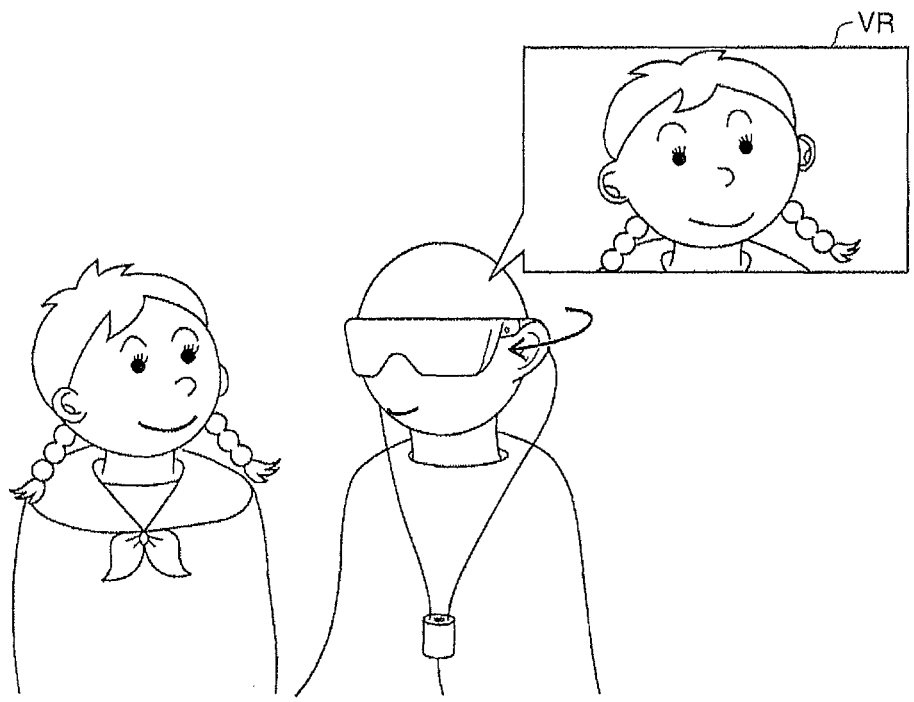

FIGS. 17A and 17B are explanatory diagrams showing states in which the movement detection processing is executed. FIG. 17A shows a state in which the user wearing the image display unit 20*b* of the head mounted display HMb presses the setting button 72. After the user presses the setting button 72, when angles and angular velocities obtained from an obtained output value of the gyro sensor 74 do not exceed the first and second thresholds, in other words, when the conditions in steps S410 to S412 are not satisfied, the turn-off of the backlights (step S414) in the movement detection processing is not performed. Therefore, as shown in FIG. 17A, the virtual image VI is displayed in the visual field VR of the user.

FIG. 17B shows a state in which the user wearing the image display unit 20*b* of the head mounted display HMb turns the user's face away from an initial position. When the user looks, for example, sideways from the initial position shown in FIG. 17A, changes occur in the angle and the angular velocity in the x axis direction calculated from an output value of the gyro sensor 74. When the angle and the angular velocity exceed the first and second thresholds and the conditions in steps S410 to S412 are satisfied, the turn-off of the backlights (step S414) in the movement detection processing is performed and the display of the virtual image VI disappears from the visual field VR of the user. As a result of the disappearance of the display of the virtual image VI that blocks the visual field VR, the user can clearly see an external scene. The same holds true when the user looks, for example, upward or downward, whereby changes occur in the angle and the angular velocity in the y axis direction calculated from an output value of the gyro sensor 74.

Further, in step S414 of the movement detection processing (FIG. 15), the detecting unit 147 may perform, for example, processing explained below instead of turning-off the backlights.

In step S414 in FIG. 15, the detecting unit 147 requests the display control unit 190 of the control unit 10*b* to reduce the luminance of the backlights. The display control unit 190 that receives the request transmits a control signal for designating the luminance of the backlights to the right-backlight control unit 201 and the left-backlight control unit 202 together with a control signal for designating turn-on and turn-off of the driving of the backlights. As the control signal for designating the luminance of the backlights, for example, a PWM (Pulse Width Modulation) signal can be used. Consequently, in step S406, a reduction of the illumination light by the backlights (the right backlight 221 and the left backlight 222) is performed instead of the turn-off of the backlights. If the illumination light is reduced, the image light emitted by the image-light generating unit becomes feeble (the luminance of the image-light generating unit decreases). Therefore, the virtual image VI displayed in the visual field VR of the user is displayed pale and blurred. As a result, the user can easily visually recognize an external scene.

In step S414 in FIG. 15, the detecting unit 147 requests the display control unit 190 of the control unit 10*b* to temporarily stop the driving of the LCDs (liquid crystals). The display control unit 190 that receives the request transmits a control signal for designating turn-off of the driving of the LCDs to the right-LCD control unit 211 and the left-LCD control unit 212. Consequently, the rendering of images by the LCDs (the right LCD 241 and the left LCD 242) is stopped and the generation and the emission of image light in the image-light generating unit are stopped. Therefore, the display of the virtual image VI disappears from the visual field VR of the user. As a result, the user can easily visually recognize an external scene.

The detecting unit 147 may request the display control unit 190 of the control unit 10*b* to reduce an aperture ratio of the LCDs (liquid crystals). If the liquid crystal aperture ratio is reduced, since the image light emitted by the image-light generating unit becomes feeble, the virtual image VI displayed in the visual field VR of the user is displayed pale and blurred. Therefore, the user can easily visually recognize an external scene.

In step S414 in FIG. 15, the detecting unit 147 requests the image processing unit 160 of the control unit 10*b* to temporarily stop the transmission of the image data Data. The image processing unit 160 that receives the request stops the image data Data to be transmitted to the image display unit 20*b*. Consequently, the rendering of images by the LCDs (the right LCD 241 and the left LCD 242) is stopped and the generation and the emission of image light in the image-light generating unit are stopped. Therefore, the display of the virtual image VI disappears from the visual field VR of the user. As a result, the user can easily visually recognize an external scene.

The detecting unit 147 may request the image processing unit 160 to change the image data Data to dummy data of a single color black. Consequently, images rendered on the LCDs (the right. LCD 241 and the left LCD 242) are adjusted to dummy images of the single color black. The image-light generating unit emits image light corresponding to the dummy images. Therefore, the virtual image VI displayed in the visual field VR of the user is displayed as if the virtual image VI disappears. Therefore, the user can easily visually recognize an external scene.

As explained above, according to the third embodiment, the detecting unit 147 detects, using angular velocity (change information indicating a change in a direction with respect to the initial position) detected by the gyro sensor 74, the movement of the head exceeding the fixed amount of the user wearing the image display unit 20b. When it is assumed that the user shifts the user's attention from the virtual image, specifically, when the movement of the head exceeding the fixed amount is detected, to reduce the visibility of the virtual image VI, the control unit 10b adjusts the luminance of the light sources (the right backlight 221 and the left backlight 222) to adjust the luminance of the image-light generating unit or adjusts images generated by the display devices (the right LCD 241 and the left LCD 242) to adjust image light generated by the image-light generating unit. As a result, in the head mounted display HMb, it is possible to detect the movement of the head exceeding the fixed amount of the user wearing the image display unit 20b and improve the visibility of an external scene.

D. Fourth Embodiment

In a fourth embodiment of the invention, a configuration for further performing, in addition to the movement detection processing, line-of-sight detection processing for detecting the direction of a line of sight of a user wearing an image display unit and erasing a virtual image is explained. In the following explanation, only components having configurations and operations different from those in the third embodiment are explained. In the figures, components same as those in the third embodiment are denoted by reference numerals and signs same as those in the third embodiment explained above and detailed explanation of the components is omitted.

D-1. Configuration of a Head-mounted Display Device

Figure 18:
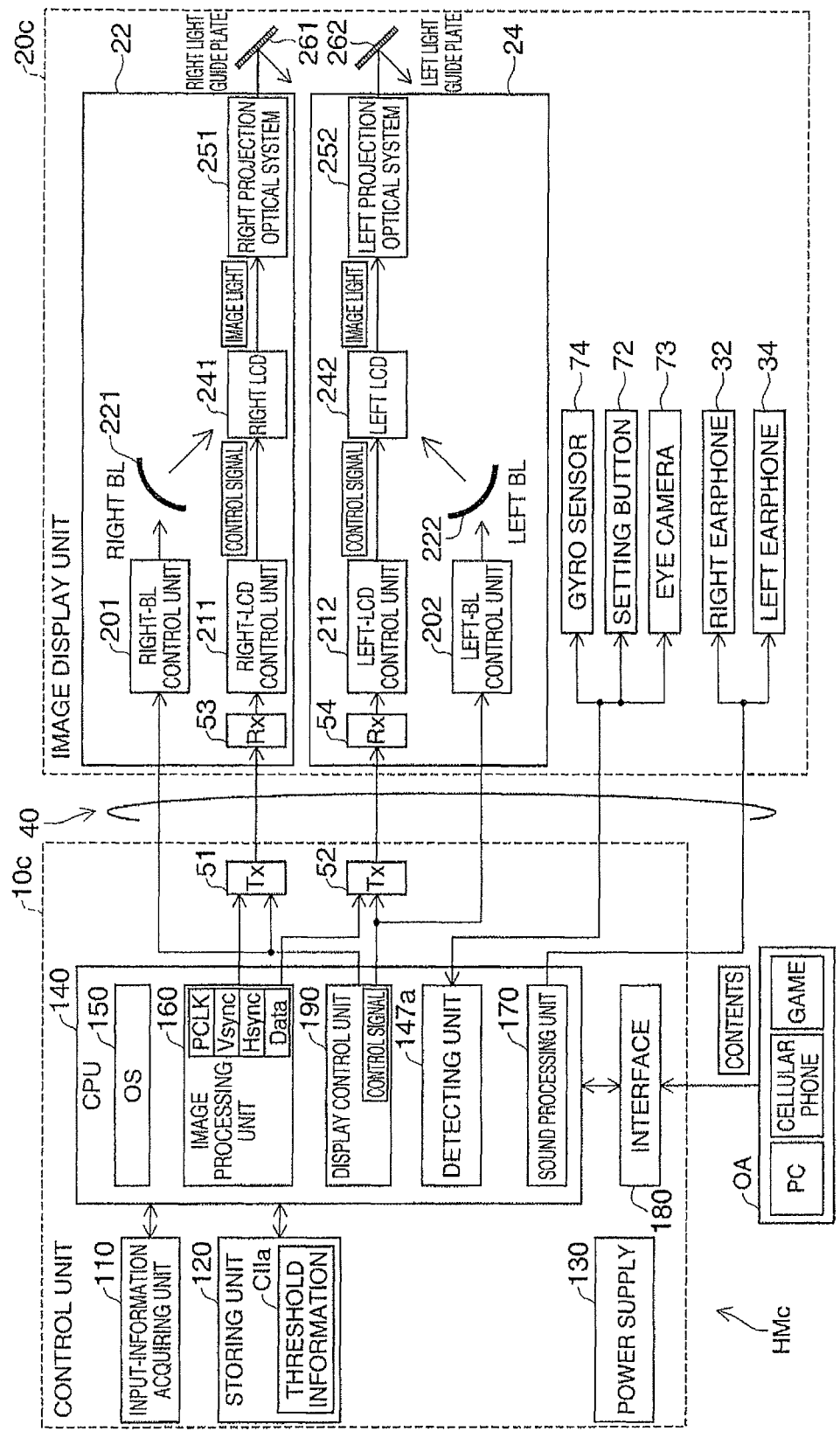
FIG. 18 is a functional block diagram showing the configuration of a head mounted display in a fourth embodiment.

FIG. 18 is a functional block diagram showing the configuration of a head mounted display HMc in the fourth embodiment. The head mounted display HMc is different from the head mounted display HMb in the third embodiment shown in FIG. 13 in that the head mounted display HMc includes a control unit 10c instead of the control unit 10b and includes an image display unit 20c instead of the image display unit 20b.

The image display unit 20c further includes an eye camera 73 functioning as an image pickup unit. The eye camera 73 in this embodiment is arranged on the inner surface of the right optical panel 26 (i.e., a surface on a side opposed to the eye of the user in a worn state of the head mounted display HMc). The eye camera 73 in this embodiment includes an infrared light and a CCD camera and acquires an eyeball image of the right eye of the user.

The control unit 10c includes threshold information CIIa instead of the threshold information CII and includes a detecting unit 147a instead of the detecting unit 147. In the threshold information CIIa, a third threshold is further stored in advance in addition to the first and second thresholds. The third threshold is used in the line-of-sight detection processing (explained later). The detecting unit 147a executes the line-of-sight detection processing in parallel to the movement detection processing (FIG. 15). The line-of-sight detection processing is processing for detecting the direction of the line of sight of the user wearing the image display unit 20b and erasing a virtual image.

D-2. Movement Detection Processing

The movement detection processing for the head mounted display HMc in the fourth embodiment is the same as the movement detection processing in the third embodiment shown in FIG. 15.

D-3. Line-of-sight Detection Processing

Figure 19:
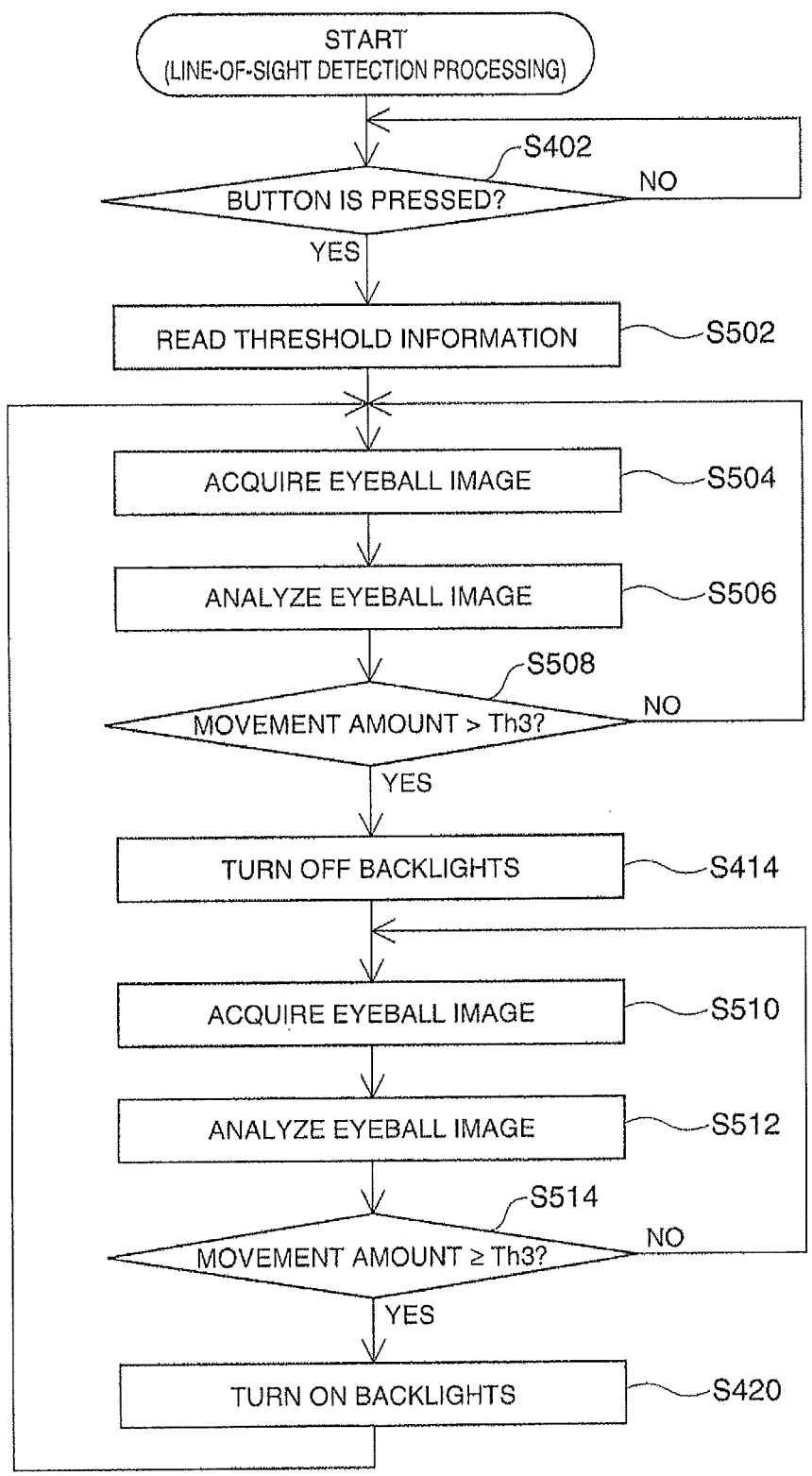
FIG. 19 is a flowchart for explaining a procedure of line-of-sight detection processing for the head mounted display in the fourth embodiment.

FIG. 19 is a flowchart for explaining a procedure of the line-of-sight detection processing for the head mounted display HMc in the fourth embodiment. First, the detecting unit 147a determines whether the setting button 72 provided in the image display section 20c is pressed (step S402). Details are the same as step S402 of the movement detection processing (FIG. 15). When the setting button 72 is pressed (YES in step S402), the detecting unit 147a reads the third threshold from the threshold information CIIa (step S502). After acquiring the threshold, the detecting unit 147a acquires an eyeball image picked up by the eye camera 73 (step S504). The detecting unit 147a analyzes the acquired eyeball image (step S506).

Figure 20A:
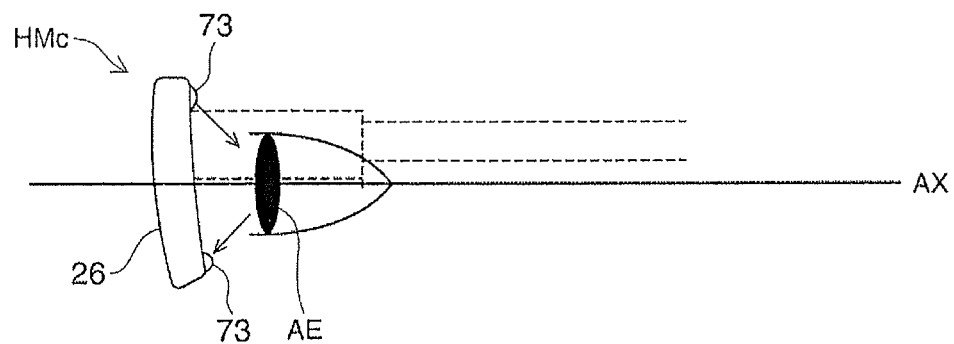
FIGS. 20A to 20C are explanatory diagrams concerning a method of analyzing an eyeball image.
Figure 20B:
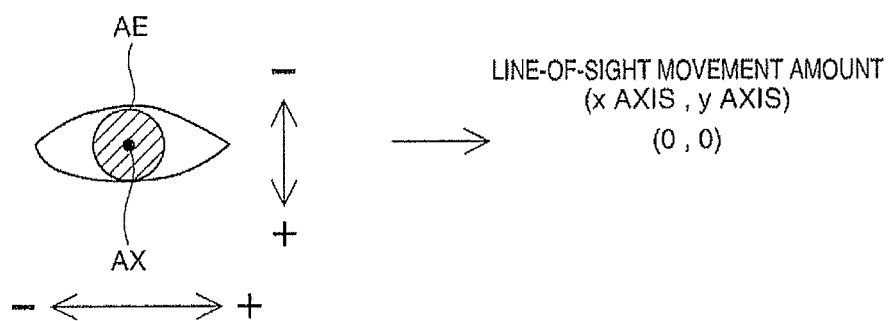
Figure 20C:
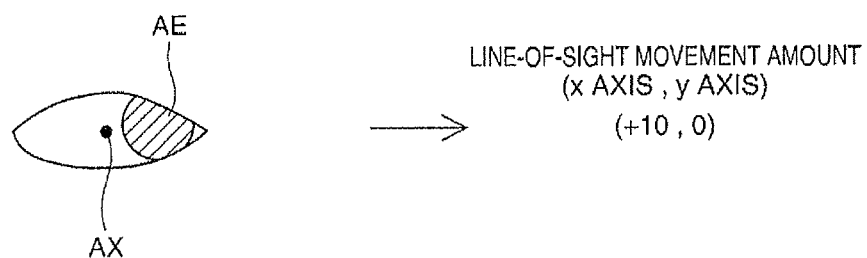

FIGS. 20A to 20C are explanatory diagrams concerning a method of analyzing an eyeball image. FIG. 20A shows a side general view of the eye of the user wearing the head mounted display HMc. The detecting unit 147a analyzes an eyeball image picked up by the eye camera 73 to thereby calculate a line-of-sight movement amount indicating how much an iris AE of the user moves with respect to a center position AX of the eye. In this embodiment, the line-of-sight movement amount is represented by a combination of a movement amount in the x axis direction and a movement amount in the y axis direction. FIG. 20B is a diagram of a case in which the iris AE is located in the center position AX and shows a line-of-sight movement amount (x axis, y axis) in the case. In this example, since the iris AE is present on the center position AX, the line-of-sight movement amount is (0, 0). FIG. 20C is a diagram of a case in which the iris AE of the user moves to the left side with respect to the center position AX and shows a line-of-sight movement amount (x axis, y axis) in the case. In this example, since the iris AE moves from the center position AX in the horizontal direction, the line-of-sight movement amount is (+10, 0).

In step S508 in FIG. 19, the detecting unit 147a determines whether at least one of the movement amount on the x axis and the movement amount on the y axis of the iris calculated in step S506 exceeds a third threshold Th3 (step S508). When both the movement amounts on the x axis and the y axis of the iris are equal to or smaller than the third threshold Th3 (NO in step S508), the detecting unit 147a shifts the processing to step S504 and acquires an eyeball image of the eye camera 73 again. On the other hand, when at least one of the movements amounts on the x axis and the y axis of the iris exceeds the third threshold Th3 (YES in step S508), the detecting unit 147a turns off the backlights (step S414). Details are the same as step S414 of the movement detection processing (FIG. 15).

After turning off the backlights, the detecting unit 147a acquires an eyeball image of the eye camera 73 (step S510). The detecting unit 147a analyzes the acquired eyeball image and calculates a line-of-sight movement amount of the iris (step S512). Details are the same as step S506. The detecting unit 147a determines whether at least one of a calculated movement amount on the x axis of the iris and a calculated movement amount on the y axis of the iris is equal to or larger than the third threshold Th3 (step S514). When both the movement amounts on the x axis and the y axis are smaller than the third threshold Th3 (NO in step S514), the detecting unit 147a shifts the processing to step S510 and acquires an eyeball image of the eye camera 73 again. On the other hand, when at least one of the movement amounts on the x axis and the y axis is equal to or larger than the third threshold Th3 (YES in step S514), the detecting unit 147a turns on the backlights. Details are the same as step S420 of the movement detection processing (FIG. 15).

As explained above, according to the fourth embodiment, the detecting unit 147a analyzes an eyeball image of the user picked up by the eye camera 73 to acquire a line-of-sight movement amount including a movement amount in the x axis direction and a movement amount in the y axis direction with respect to the center position AX of the iris AE of the user. When the line-of-sight movement amount exceeds the third threshold Th3 set in advance, the control unit 10b adjusts the luminance of the image-light generating unit or adjusts image light generated by the image-light generating unit to reduce the visibility of a virtual image. As a result, according to this embodiment, in addition to the effect of the third embodiment, it is possible to detect that the user shifts the line of sight away from the center position and improve the visibility of an external scene.

E. Modifications

The invention is not limited to the embodiments explained above. Various configurations can be adopted without departing from the spirit of the invention. For example, the functions realized by software may be realized by hardware. Besides, modifications explained below are possible.

E1. Modification 1

In the embodiments, the configuration of the head mounted display is exemplified. However, the configuration of the head mounted display can be arbitrarily set without departing from the spirit of the invention. For example, addition, deletion, conversion, and the like of the components are possible.

In the embodiments, for convenience of explanation, the control unit includes the transmitting units (51 and 52) and the image display unit includes the receiving units (53 and 54). However, both the transmitting units (51 and 52) and the receiving units (53 and 54) in the embodiments have a function of being capable of performing bidirectional communication and can function as transmitting and receiving units.

Figure 21:
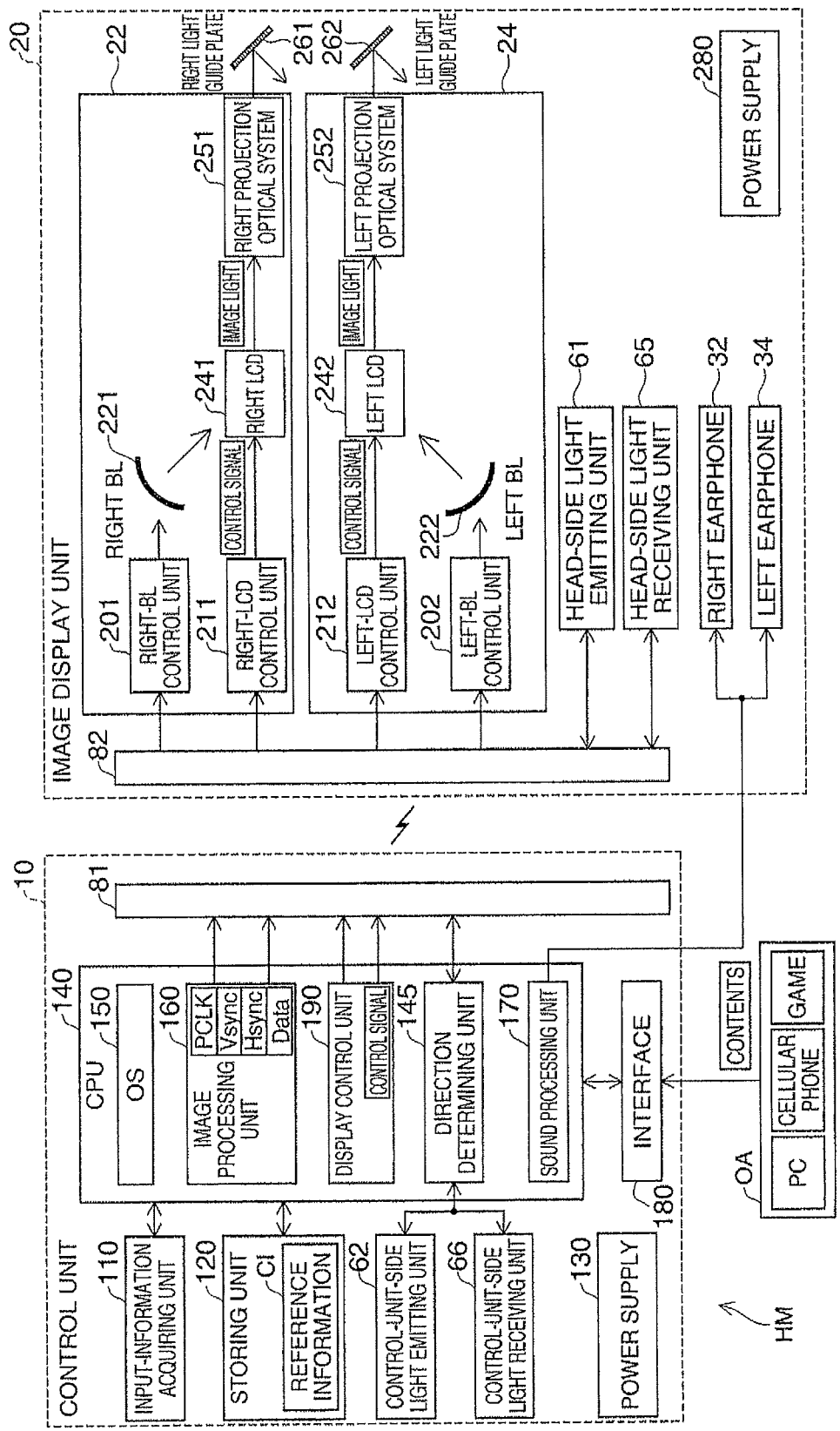
FIG. 21 is a functional block diagram showing the configuration of a head mounted display in a modification.

For example, as shown in FIG. 21, the connecting unit may be omitted and the control unit and the image display unit may be capable of communicating with each other by radio. Specifically, the control unit further includes a radio communication unit (81) and further includes a radio communication unit (82) and a power supply (280) in the image display unit. In this case, the radio communication unit 81 functions as the transmitting units (51 and 52) in the embodiments and the radio communication unit 82 functions as the receiving units (53 and 54) in the embodiments.

For example, the configurations of the control unit and the image display unit shown in FIG. 1 can be arbitrarily changed. Specifically, for example, the touch panel may be omitted from the control unit and may be operated only with the cross key. Another interface for operation such as a stick for operation may be provided in the control unit. Devices such as a keyboard and a mouse may be able to be connected to the control unit to receive inputs from the keyboards and the mouse. A communication unit employing Wi-Fi (wireless fidelity) or the like may be provided in the control unit.

For example, the control unit shown in FIG. 1 is connected to the image display unit via a wired signal transmission line. However, the control unit and the image display unit may be connected via a wireless signal transmission line such as a wireless LAN, infrared communication, or Bluetooth (registered trademark).

For example, the head mounted display is a transmissive head mounted display of a binocular type. However, the head mounted display may be a nontransmissive head mounted display in which an external scene is blocked in a state in which the user wears the head mounted display. The head mounted display may be a head mounted display of a monocular type.

For example, the image-light generating unit is configured using the left and right-backlight control units, the left and right-LCD control units, the left and right backlights, and the left and right LCDs. However, instead of these devices, an organic EL (Organic Electro-Luminescence) and an organic-EL control unit may be used. In that case, the organic EL and the organic-EL control unit correspond to "image-light generating unit".

For example, the functional units such as the detecting unit, the image processing unit, the display control unit, and the sound processing unit are described as being realized by the CPU expanding the computer program stored in the ROM or the hard disk on the RAM and executing the computer program. However, these functional units may be configured using an ASIC (Application Specific Integrated Circuit) designed to realize the functions.

For example, in the embodiments, the head mounted display is the head mounted display, the image display unit of which is worn like eyeglasses. However, the image display unit may be a usual flat display device (a liquid crystal display device, a plasma display device, an organic EL display device, etc.). Even in this case, the connection between the control unit and the image display unit may be connection via a wired signal transmission line or may be connection via a wireless signal transmission line. Consequently, it is possible to use the control unit as a remote controller of the usual flat display device.

As the image display unit, an image display unit having another shape such as an image display unit worn like a cap may be adopted instead of the image display unit worn like eyeglasses. As the earphones, earphones of an ear hooking type or a headband type may be adopted. The earphones may be omitted.

For example, in the embodiments, the secondary battery is used as the power supply. However, the power supply is not limited to the secondary battery. Various batteries can be used as the power supply. For example, a primary battery, a fuel battery, a solar battery, and a thermal battery may be used.

E2. Modification 2

In the embodiments, the image processing unit outputs the same image data as image data for the right eye and image data for the left eye. However, the image processing unit may be configured to be capable of outputting different image data as image data for the right eye and image data for the left eye to cause the user to visually recognize a 3D virtual image.

E3. Modification 3

In the user-side see-through processing (FIGS. 5 and 11) in the embodiments, the direction determining unit determines whether the control unit and the image display unit are opposed to each other according to whether the direction determining unit receives output signals from the head-side light receiving unit and the control-unit-side light receiving unit. However, the form in the embodiments is only an example. The direction determining unit can determine whether the control unit and the image display unit are opposed to each other using various methods.

For example, one of the set of the head-side light emitting unit and the control-unit-side light receiving unit or the set of the control-unit-side light emitting unit and the head-side light receiving unit may be omitted. Consequently, as in the embodiments, in the head mounted display, it is possible to detect, with a configuration different from that in the past, that the user attempts to operate the control unit. It is possible to improve the visibility of an external scene in the image display unit. Since only one set of the light emitting unit and the light receiving unit is necessary, the configuration can be realized at low cost.

For example, instead of the light emitting units (the head-side light emitting unit and the control-unit-side light emitting unit) and the light receiving units (the head-side light emitting unit and the control-unit-side light emitting unit) or in addition to the light emitting units and the light receiving units, the head mounted display may includes, in the image display unit, an acceleration-information detecting unit for detecting acceleration information of the image display unit and an angular-velocity-information detecting unit for detecting angular velocity information of the image display unit. As the acceleration-information detecting unit, for example, an acceleration sensor can be used. As the angular-velocity-information detecting unit, for example, a gyro sensor can be used.

When the head mounted display includes the acceleration-information detecting unit and the angular-velocity-information detecting unit instead of the light emitting units and the light receiving units, the direction determining unit can determine that the operation surface and the image display unit are opposed to each other (YES in step S104) when the movement of the image display unit derived from the acceleration information and the angular velocity information (i.e., the movement of the head of the user wearing the image display unit) coincides with movement assumed in advance (e.g., the user moves the head downward to look at the operation surface). Consequently, when the head mounted display includes the acceleration-information detecting unit and the angular-velocity-information detecting unit instead of the light emitting units and the light receiving units, it is possible to obtain effects same as those of the embodiments.

When the head mounted display includes the acceleration-information detecting unit and the angular-velocity-information detecting unit in addition to the light emitting units and the light receiving units, the direction determining unit can further determine whether the movement of the image display unit (the movement of the head of the user) derived from the acceleration information and the angular velocity information coincides with movement assumed in advance (e.g., downward movement of the head) when the direction determining unit receives output signals from both of the head-side light receiving unit and the control-unit-side light receiving unit (YES in step S104). Consequently, it is possible to further improve accuracy of the determination concerning "whether the user faces the operation surface" in the user-side see-through processing.

When the head mounted display includes the acceleration-information detecting unit and the angular-velocity-information detecting unit in addition to the light emitting units and the light receiving units and the backlights include plural light emitting members (LEDs), the direction determining unit can further determine, according to the movement of the image display unit (the movement of the head of the user) derived from the acceleration information and the angular velocity information, which of the plural light emitting members are turned off when the backlights are turned of f (step S106). Consequently, since the display of the virtual image in a portion equivalent to a region corresponding to the movement of the head of the user is erased, it is possible to improve convenience for the user.

The head mounted display may include a distance measurement sensor in the image display unit instead of, or in addition to, the light emitting units and the light receiving units. When the head mounted display includes the distance measurement sensor instead of the light emitting units and the light receiving units, it is possible to obtain effects same as those in the embodiments. When the head mounted display includes the distance measurement sensor in addition to the light emitting units and the light receiving units, it is possible to further improve accuracy of the determination concerning "whether the user faces the operation surface" in the user-side see-through processing. Further, the direction determining unit may adjust the luminance of the light source according to a distance between the control unit and the image display unit derived from a measurement result of the distance measurement sensor. For example, when the distance between the control unit and the image display unit is small, the direction determining unit can reduce the luminance of the light source (i.e., reduce the luminance of the image-light generating unit and make the display of the virtual image VI pale). When the distance between the control unit and the image display unit is large, the direction determining unit can increase the luminance of the light source (i.e., increase the luminance of the image-light generating unit and make the display of the virtual image VI dark).

When the head mounted display includes the distance measurement sensor in the image display unit instead of the light emitting units and the light receiving units or in addition to the light emitting units and the light receiving units and the backlights include plural light emitting members (LEDs), in turning off the backlights (step S106), the direction determining unit can determine, according to a distance between the control unit and the image display unit derived from a measurement result of the distance measurement sensor, which of the plural light emitting members are turned off. For example, when the distance between the control unit and the image display unit is small, the direction determining unit can increase the number of light emitting members to be turned off (i.e., increase the area of a region without image display in the virtual image VI). When the distance between the control unit and the image display unit is large, the direction determining unit can reduce the number of light emitting members to be turned off (i.e., reduce the area of the region without image display in the virtual image VI).

An image pickup unit (e.g., a CCD camera) may be provided in the control unit or the image display unit instead of the light emitting units and the light receiving units or in addition to the light emitting units and the light receiving units. When the image pickup unit is provided in the control unit, the direction determining unit analyzes a picked-up image and determines whether the optical panel housing of the image display unit is included in the image. When the optical panel housing is included in the picked-up image, the direction determining unit can determine that the operation surface and the image display unit are opposed to each other (YES in step S104). On the other hand, when the image pickup unit is provided in the image display unit, the direction determining unit analyzes a picked-up image and determines whether the touch pad and the cross key arranged on the operation surface of the control unit are included in the image. When the touch pad and the cross key are included in the picked-up image, the direction determining unit can determine that the operation surface and the image display unit are opposed to each other (YES in step S104). When the image pickup unit is provided instead of the light emitting units and the light receiving units, it is possible to obtain effects same as those of the embodiments. When the image pickup unit is provided in addition to the light emitting units and the light receiving units, it is possible to further improve accuracy of the determination concerning "whether the user faces the operation surface" in the user-side see-through processing.

E4. Modification 4

In the user-side see-through processing (FIG. 11) in the second embodiment, when contact is detected by the contact detecting unit, the direction determining unit drives the light emitting units (the head-side light emitting unit and the control-unit-side light emitting unit). However, the form in the embodiments is only an example. Various modifications are possible.

For example, the control unit may include, instead of the contact detecting unit, an acceleration-information detecting unit (an acceleration sensor) for detecting acceleration information of the control unit. In this case, when the acceleration-information detecting unit detects the tilt of the control unit, the direction determining unit can determine YES in step S202. Consequently, when the control unit includes the acceleration-information detecting unit instead of the contact detecting unit, it is possible to obtain effects same as those in the embodiments.

For example, the control unit can use the touch pad as the contact detecting unit. Consequently, it is possible to realize the head mounted display at low cost.

E5. Modification 5

In the movement detection processing (FIGS. 14A and 14B) in the embodiments, the detecting unit detects, according to an output value from the gyro sensor, the movement of the head exceeding the fixed amount of the user. However, the form in the embodiments is only an example. The detecting unit can detect the movement of the head exceeding the fixed amount of the user using various methods.

For example, in step S410 of the movement detection processing, the detecting unit determines whether at least one of the angle of the x axis and the angle of the y axis obtained from the output value of the gyro sensor exceeds the same threshold (the first threshold Th1). However, in general, the movement of the face in the horizontal direction is larger than the movement of the head in the perpendicular direction (the vertical direction). Therefore, two kinds of the first threshold Th1 may be prepared to be associated with the perpendicular direction (for the y axis) and horizontal direction (for the x axis). The same holds true concerning step S412.

For example, in the embodiments, the two-axis angular velocity sensor of the piezoelectric vibration type is used as the gyro sensor to detect the movement of the head in the perpendicular direction (the vertical direction) and the movement of the face in the horizontal direction of the user. However, as the gyro sensor, angular velocity sensors of various types such as one-axis and three-axis types can be used. If the number of axes that the gyro sensor can detect increases, it is possible to finely detect the movement of the head of the user.

For example, an acceleration sensor may be further provided in the image display unit and, in addition to the determination in steps S406 to S412 of the movement detection processing, the detecting unit may determine "the movement of the head exceeding a fixed amount" using the tilt, the movement, the vibration, and the impact of the image display unit obtained from an output value of the acceleration sensor. If both of the gyro sensor and the acceleration sensor are used, it is possible to improve accuracy of the determination in the detecting unit. In this case, the acceleration sensor corresponds to "acceleration detecting unit" in the appended claims.

For example, the image display unit may include, instead of the gyro sensor, an electronic compass that detects, using terrestrial magnetism, a direction in which the image display unit faces and an acceleration sensor that detects the acceleration of the image display unit. In this case, the determining unit can perform the determination in step S410 of the movement detection processing using an angle calculated from the direction detected by the electronic compass and can perform the determination in step S412 of the movement detection processing using the acceleration detected by the acceleration sensor. The electronic compass corresponds to "terrestrial-magnetism detecting unit" in the appended claims. The acceleration sensor corresponds to "acceleration detecting unit" in the appended claims. Consequently, in the configuration including the electronic compass and the acceleration sensor instead of the gyro sensor, it is possible to obtain effects same as those of the embodiments.

E6. Modification 6

In the movement detection processing (FIGS. 14A and 14B) in the embodiments, the detecting unit is triggered by pressing of the setting button to set an initial position and continues the movement detection processing. However, various changes of the trigger are possible.

For example, step S402 of the movement detection processing may be omitted. The detecting unit may set an initial position and execute step S404 and subsequent steps when the head mounted display HMb is powered on.

For example, in step S402 of the movement detection processing, when the detecting unit determines that the user keeps the same posture for a fixed time, the detecting unit may set an initial position and execute step S404 and subsequent steps. Specifically, the detecting unit can determine the posture of the user by monitoring changes in an angle and angular velocity obtained from an output value of the gyro sensor. Consequently, since the operation of the setting button by the user is unnecessary, it is possible to improve convenience of use (usability) of the head mounted display HMb.

For example, in step S402 of the movement detection processing, when the detecting unit detects startup of a specific application (e.g., movement reproduction software) installed in the head mounted display HMb, the detecting unit may set an initial position and execute steps S404 and subsequent steps. The specific application can be arbitrarily set and can be designated by the user.

For example, when an acceleration sensor is further provided in the image display unit, in step S402 of the movement detection processing, the detecting unit may detect "a movement of patting the image display unit" and set an initial position on the basis of acceleration obtained from an output value of the acceleration sensor and execute step S404 and subsequent steps. Consequently, since the setting button is omitted, it is possible to improve convenience of use (usability) of the head mounted display HMb.

E7. Modification 7

In the embodiments, the arrangement of the acquiring unit for acquiring change information is exemplified. However, the arrangement of the acquiring unit for acquiring change information is only an example. Various changes of the arrangement are possible.

For example, in the third embodiment, the gyro sensor functioning as the acquiring unit is arranged on the inside of the housing of the right display unit. However, gyro sensors may be arranged in both the right display unit and the left display unit. In that case, in the movement detection processing (FIGS. 14A and 14B), output values of the left and right gyro sensors may be compared to calculate an angle and the like.

For example, in the fourth embodiment, the eye camera functioning as the acquiring unit is arranged on the inner surface of the right optical panel. However, eye cameras may be arranged on both the inner surface of the right optical panel and the inner surface of the left optical panel. In that case, in the line-of-sight detection processing (FIG. 19), a line-of-sight movement amount may be calculated using the movement of the left and right irises detected by the left and right eye cameras.

The entire disclosure of Japanese Patent Application Nos. 2011-066373, filed Mar. 24, 2011 and 2011-066393, filed Mar. 24, 2011 are expressly incorporated by reference herein.

What is claimed is:

1. A head-mounted display device comprising:
an image display unit including an image-light generating unit that generates image light representing an image and emits the image light and a light guide unit that guides the emitted image light to an eye of a user, the image display unit causing the user to visually recognize a virtual image; and
a control unit that is connected to the image display unit and controls image display by the image display unit, the control unit including an operation surface that controls an operation of the head-mounted display device based on finger operation by the user detected on the operation surface; and a direction determining unit that determines whether the user faces the operation surface of the control unit, wherein
if the direction determination unit determines that the user faces the operation surface, the control unit adjusts luminance of the image-light generating unit or adjusts the image light generated by the image-light generating unit to reduce visibility of the virtual image.

2. The head-mounted display device according to claim 1, the image display unit further including a distance measurement sensor that measures a distance between the control unit and the image display unit.

3. The head-mounted display device according to claim 2, wherein the direction determining unit adjusts the luminance of the image-light generating unit based on the measured distance between the control unit and the image display unit.

4. The head-mounted display device according to claim 2, wherein the direction determining unit adjusts the image light generated by the image-light generating unit based on the measured distance between the control unit and the image display unit.

5. The head-mounted display device according to claim 1, further comprising:
an image pickup unit,
wherein the direction determining unit determines whether the operation surface and the image display unit are opposed to each other based on analysis of a picked-up image obtained from the image pickup unit.

6. The head-mounted display device according to claim 5, wherein
the image pickup unit is provided in the control unit, and
the analysis of the picked-up image includes determining whether a portion of the image display unit is included in the picked-up image.

7. The head-mounted display device according to claim 5, wherein
the image pickup unit is provided in the image display unit, and
the analysis of the picked-up image includes determining whether a portion of the control unit is included in the picked-up image.

8. A control method for a head-mounted display device including an operation surface, the control method comprising:
(a) causing a user to visually recognize a virtual image by using an image-light generating unit that generates image light representing an image and emits the image light and a light guide unit that guides the emitted image light to an eye of the user;
(b) controlling image display in (a) by using the operation surface to control an operation of the head-mounted display device based on finger operation by the user detected on the operation surface;
(c) determining, by a direction determination unit, whether the user faces the operation surface to control the operation of the head-mounted display device; and
(d) if the direction determination unit determines that the user faces the operation surface, adjusting luminance of the image-light generating unit or adjusting the image light generated by the image-light generating unit to reduce visibility of the virtual image.

9. The control method according to claim 8, further comprising:
measuring a distance between the control unit and the image display unit.

10. The control method according to claim 9, further comprising:
adjusting the luminance of the image-light generating unit based on the measured distance between the control unit and the image display unit.

11. The control method according to claim 9, further comprising:
adjusting the image light generated by the image-light generating unit based on the measured distance between the control unit and the image display unit.

12. The control method according to claim 8, further comprising:
determining whether the operation surface and the image display unit are opposed to each other based on analysis of a picked-up image obtained from an image pickup unit.

13. The control method according to claim 12, wherein when the image pickup unit is provided in the control unit, the analysis of the picked-up image includes determining whether a portion of the image display unit is included in the picked-up image.

14. The control method according to claim 12, wherein when the image pickup unit is provided in the image display unit, the analysis of the picked-up image includes determining whether a portion of the control unit is included in the picked-up image.

15. The head-mounted display device according to claim 1, wherein the image display unit and the control unit communicate with each other wirelessly.

16. The head-mounted display device according to claim 15, wherein
- the image display unit further includes a first radio communication unit,
- the control unit further includes a second radio communication unit, and
- the image display unit and the control unit communicate with each other wirelessly via the first radio communication unit and the second radio communication unit.

17. The control method according to claim 8, wherein the image display unit and the control unit communicate with each other wirelessly.

18. The control method according to claim 17, wherein the image display unit and the control unit communicate with each other wirelessly via a first radio communication unit of the image display unit and a second radio communication unit of the control unit.

\* \* \* \* \*